US012559589B2

(12) United States Patent
Wang et al.

(10) Patent No.: US 12,559,589 B2
(45) Date of Patent: Feb. 24, 2026

(54) HIGH-TEMPERATURE SELF-CROSSLINKING-BASED FLAME-RETARDANT ANTI-DRIPPING COPOLYESTER, AND PREPARATION METHOD THEREFOR AND APPLICATION THEREOF

(71) Applicant: SICHUAN UNIVERSITY, Sichuan (CN)

(72) Inventors: Yuzhong Wang, Sichuan (CN); Lin Chen, Sichuan (CN); Yanpeng Ni, Sichuan (CN); Teng Fu, Sichuan (CN); Wanshou Wu, Sichuan (CN); Bowen Liu, Sichuan (CN); Haibo Zhao, Sichuan (CN); Xiuli Wang, Sichuan (CN)

(73) Assignee: SICHUAN UNIVERSITY, Sichuan (CN)

( * ) Notice: Subject to any disclaimer, the term of this patent is extended or adjusted under 35 U.S.C. 154(b) by 411 days.

(21) Appl. No.: 18/011,333

(22) PCT Filed: Jun. 16, 2021

(86) PCT No.: PCT/CN2021/100356
§ 371 (c)(1),
(2) Date: Dec. 19, 2022

(87) PCT Pub. No.: WO2021/254391
PCT Pub. Date: Dec. 23, 2021

(65) Prior Publication Data

US 2023/0235116 A1 Jul. 27, 2023

(30) Foreign Application Priority Data

Jun. 19, 2020 (CN) ......................... 202010568973.0
Jun. 11, 2021 (CN) ......................... 202110655645.9

(51) Int. Cl.
*C08G 63/68* (2006.01)
*B33Y 70/00* (2020.01)
(Continued)

(52) U.S. Cl.
CPC .......... *C08G 63/6928* (2013.01); *B33Y 70/00* (2014.12); *C08G 63/6886* (2013.01);
(Continued)

(58) Field of Classification Search
USPC ........ 528/190, 193, 194, 272, 274, 280, 287
See application file for complete search history.

(56) References Cited

FOREIGN PATENT DOCUMENTS

| | | |
|---|---|---|
| CN | 102174183 A | 9/2011 |
| CN | 102863611 A | 1/2013 |

(Continued)

OTHER PUBLICATIONS

Jia-Ning Wu et al "New application for aromatic Schiff base: High efficient flame-retardant and anti-dripping action for polyesters" Chemical Engineering Journal 336 (2018) 622-632 (Year: 2018).*

(Continued)

*Primary Examiner* — Terressa Boykin
(74) *Attorney, Agent, or Firm* — Scully, Scott, Murphy & Presser, P.C.

(57) ABSTRACT

A copolyester, comprising structural units represented by [I], [II], [III] and [IV]. The number of structural units represented by [III] is 1-99% of the number of structural units represented by [I], and the number of structural units represented by [IV] is 0-99% of the number of structural units represented by [I]. Also provided are a preparation method therefor and an application thereof. Because an introduced high-temperature self-crosslinking group and an ion group can improve the melt viscosity and the melt intensity during burning of a copolyester, and effectively enhance the char-forming capability of the copolyester, the copolyester exhibits excellent flame retardance and anti-dripping performance. The preparation process for the copolyester is mature, convenient to operate, and easy to control and apply to industrial production.

[I]

[II]

[III]

A (Continued)

-continued
B
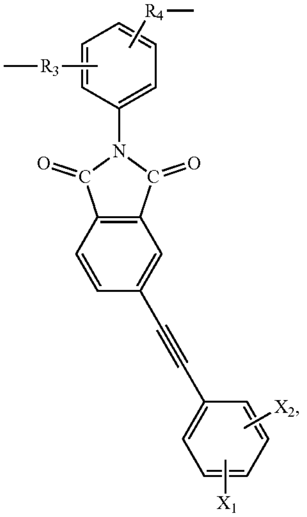
C
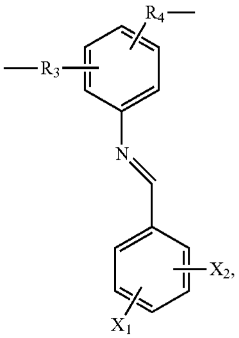
D
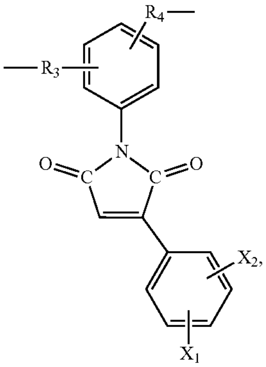
E
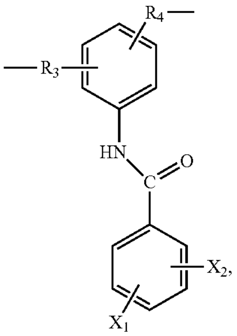
-continued
F
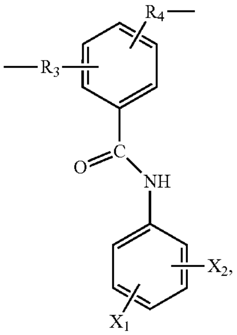
G
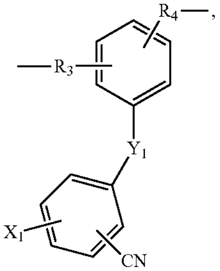
H
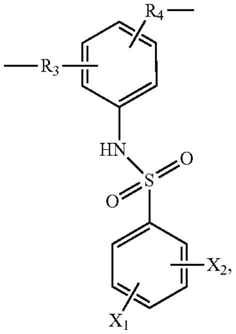
I
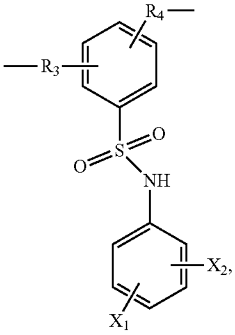
J
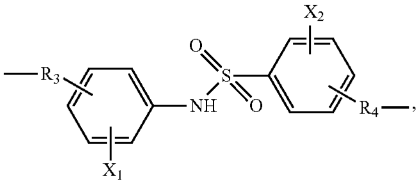

-continued
K
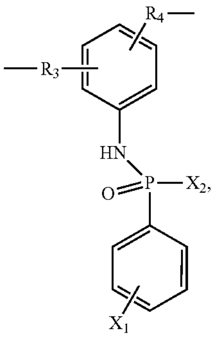
L
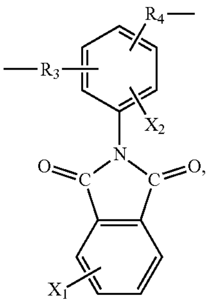
M
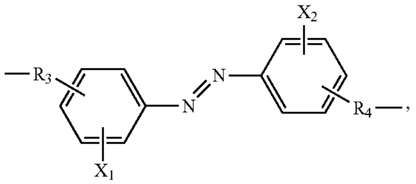
N
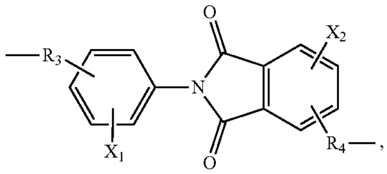
O
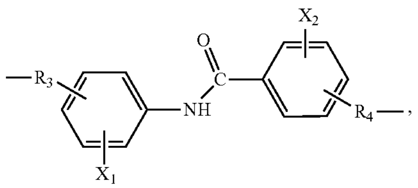
P
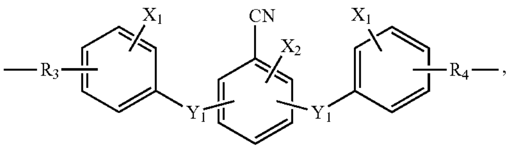
Q
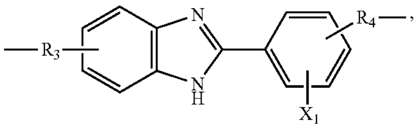
-continued
R
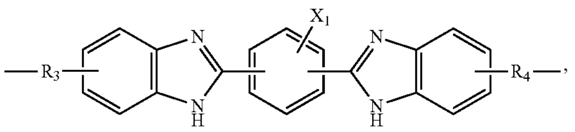
[IV]
$A_1$
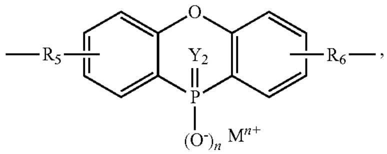
$B_1$
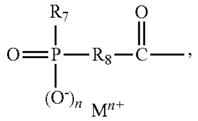
$C_1$
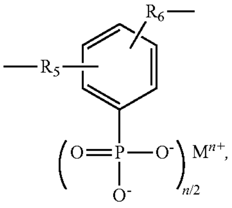
$D_1$
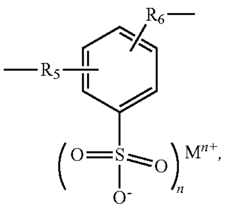
$E_1$
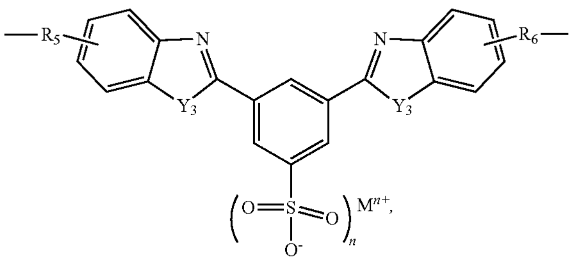
$F_1$
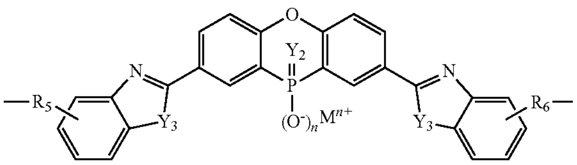
14 Claims, 3 Drawing Sheets
(51) Int. Cl.
| | |
|---|---|
| ***C08G 63/688*** | (2006.01) |
| ***C08G 63/692*** | (2006.01) |
| ***C08G 63/86*** | (2006.01) |

| | |
|---|---|
| ***C08J 5/18*** | (2006.01) |
| ***C09D 167/02*** | (2006.01) |
| ***C09D 167/06*** | (2006.01) |
| ***D01F 6/84*** | (2006.01) |

(52) U.S. Cl.

CPC ..... *C08G 63/6888* (2013.01); *C08G 63/6926* (2013.01); *C08G 63/866* (2013.01); *C08J 5/18* (2013.01); *C09D 167/02* (2013.01); *C09D 167/06* (2013.01); *D01F 6/84* (2013.01); *C08J 2367/02* (2013.01); *C08J 2367/06* (2013.01)

(56) References Cited

FOREIGN PATENT DOCUMENTS

| | | | | | |
|---|---|---|---|---|---|
| CN | 102924702 A | | 2/2013 | | |
| CN | 104478789 A | | 4/2015 | | |
| CN | 104592094 A | | 5/2015 | | |
| CN | 105273173 A | | 1/2016 | | |
| CN | 107189048 A | | 9/2017 | | |
| CN | 108359084 A | | 8/2018 | | |
| CN | 108395526 A | | 8/2018 | | |
| CN | 109467687 A | | 3/2019 | | |
| CN | 109517152 A | * | 3/2019 | ......... | C08G 63/6856 |
| GB | 982584 A | | 2/1965 | | |

OTHER PUBLICATIONS

Yi Zhang et al "A phosphorus-containing PET ionomer: from ionic aggregates to flame retardance and restricted melt-dripping", Polym. Chem., 2014, 5, 1982 (Year: 2014).*

Hai-Bo Zhao et al "A novel flame-retardant-free copolyester: cross-linking towards self extinguishing and non-dripping", J. Mater. Chem., 2012, 22, 19849 (Year: 2012).*

Written Opinion of the International Searching Authority for parent Application PVT/CN2021/100356 , dated Sep. 15, 2021 (Year: 2021).*

CN-109517152-A Machine Translation (Year: 2019).*

* cited by examiner

HIGH-TEMPERATURE SELF-CROSSLINKING-BASED FLAME-RETARDANT ANTI-DRIPPING COPOLYESTER, AND PREPARATION METHOD THEREFOR AND APPLICATION THEREOF

CROSS-REFERENCE TO RELATED APPLICATIONS

The present application is a national phase entry of PCT International Application No. PCT/CN2021/100356, filed on Jun. 16, 2021, which claims priority to Chinese Patent Application No. 202010568973.0, filed on Jun. 19, 2020 and Chinese Patent Application No. 202110655645.9, filed on Jun. 11, 2021. The disclosures of PCT International Application No. PCT/CN2021/100356 and Chinese Patent Application Nos. 202010568973.0 and 202110655645.9 are incorporated herein by reference in their entirety as part of the present application.

FIELD OF THE INVENTION

The present disclosure belongs to the field of polymer materials. In particular, the present disclosure relates to a class of copolyesters with high-temperature self-crosslinking, flame-retardant and anti-dripping properties, and their preparation method and use.

BACKGROUND OF THE INVENTION

Semi-aromatic polyester (referred to as polyester for short) such as polyethylene terephthalate (PET) and polybutylene terephthalate (PBT) is used as synthetic fibers, films, packaging materials for bottles and engineering plastics, etc. because of its excellent thermal stability, mechanical properties, shape retention properties, corrosion resistance, low gas permeability and other advantages. However, polyester is an extremely flammable polymer, which not only emits a lot of heat and smoke when burning, but also is accompanied by severe flammable molten dripping behavior. In the event of a fire incident, the heat released by the combustion of polyester will accelerate the spread of the flame. The molten dripping will cause burns and secondary fires. The thick smoke not only brings inconvenience to rescue and escape, but also easily leads to suffocation of people. These greatly limit application of the polyester in areas with flame retardant requirements, such as public transportation, protective clothing, automotive interiors, decorative fabrics for hotels and shopping malls, and electronic devices.

At present, the most commonly used flame retardant method for polyester is melt blending or copolymerization with halogen-based flame retardants or phosphorus-based flame retardants. Halogen-based flame retardants are gradually eliminated by the market due to the generation of toxic and corrosive gases such as hydrogen halide and dioxin during combustion, which endanger personal safety. Although phosphorus-based flame retardants are high-efficiency flame retardants used for polyesters, almost all commercially available phosphorus-containing flame retardants achieve flame retardant effects by promoting the mode of "melt dripping to take away heat", which leads to an irreconcilable contradiction between flame retardancy and anti-dripping of polyesters. Moreover, many phosphorus-containing flame retardants can also worsen the smoke release behavior of polyesters. Therefore, how to realize both flame-retardancy and anti-dripping of polyesters is an urgent problem to be solved in the industry and academia.

Some research results disclosed at present are mainly addition of anti-dripping agents, such as polytetrafluoroethylene and its derivatives, glass fiber, and silica into polyester. Although these additives can improve flame retardant properties and anti-dripping effect of polyester to a certain extent, but in addition to greatly destroying the mechanical properties and spinnability of polyester, it cannot solve the serious problem of smoke release when polyester is burned. During use, these additives may also migrate from polyester and be released to the environment. Therefore, there is a problem that the flame retardant effect is not long-lasting, and long-term use will also bring potential environmental pollution and health problems.

SUMMARY OF THE INVENTION

A first aspect of the present disclosure provides a class of copolyesters comprising structural units represented by the following [I], [II], [III] and [IV]:

structural unit [I]

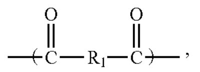

wherein $R_1$ represents an arylene group;

structural unit [II]

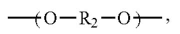

wherein $R_2$ represents an alkylene group;

structural unit [III], which has a structure selected from formulae [A]-[R],

A

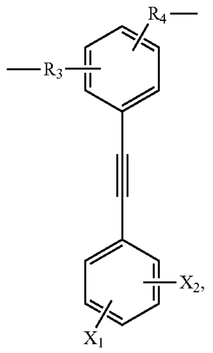

-continued
B
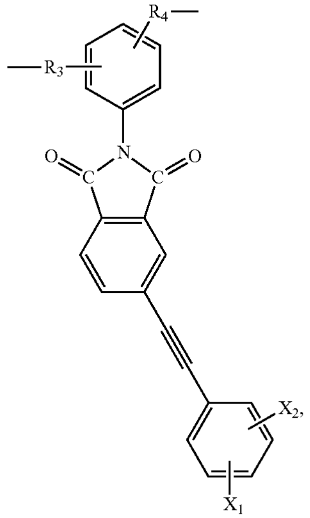
C
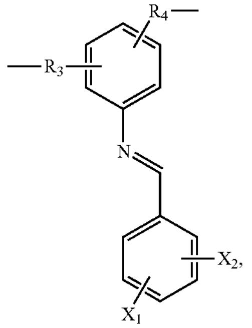
D
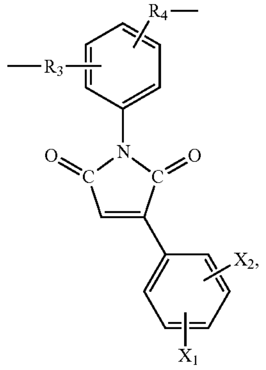
E
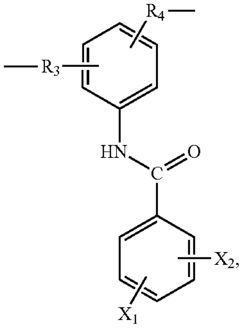
-continued
F
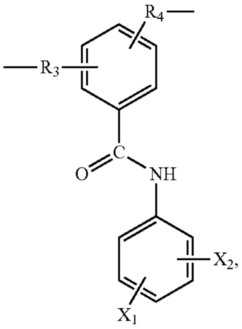
G
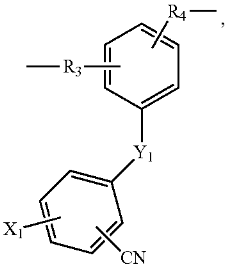
H
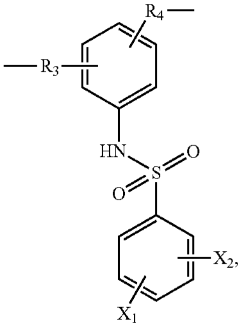
I
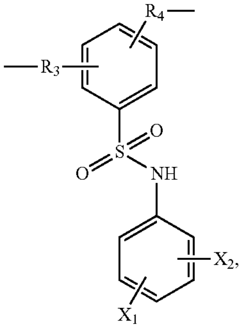
J
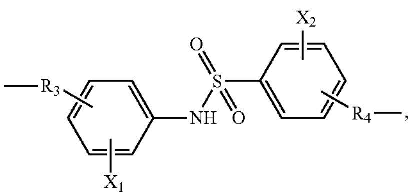

-continued

K

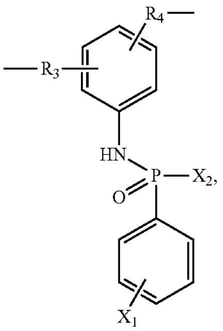

L

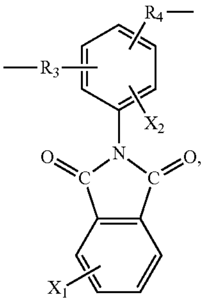

M

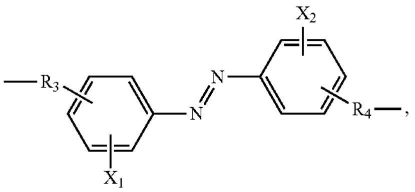

N

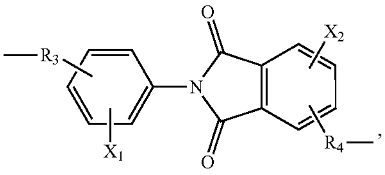

O

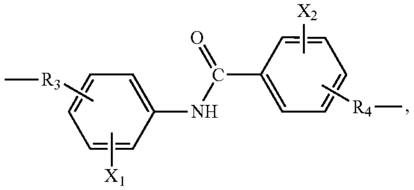

P

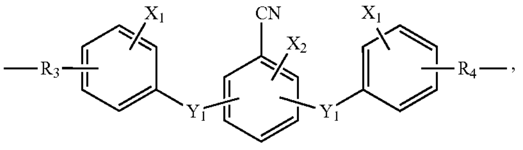

Q

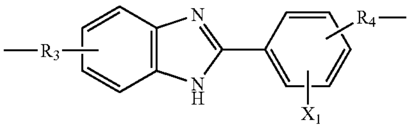

or

-continued

R

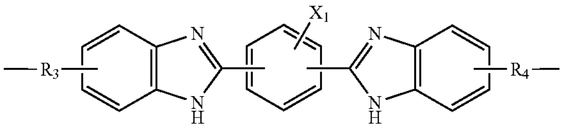

in formulae [A]-[R], $R_3$ and $R_4$ are the same or different and are any one of carbonyl, O atom or $O-(CH_2)_a-O$, wherein a is an integer of 2 to 12; $X_1$ and $X_2$ are the same or different and are any one of H atom, hydroxyl, methyl, ethyl, cyano, methoxy, phenylacetylenyl or phenyl; $Y_1$ is O atom or S atom;

structural unit [IV], which has a structure selected from formulae [$A_1$]-[$F_1$], $A_1$

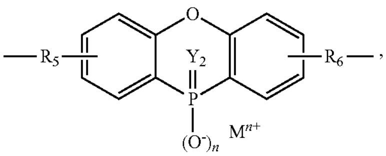

$B_1$

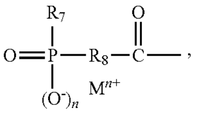

$C_1$

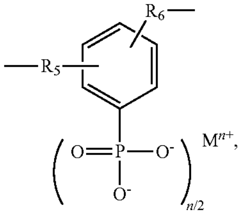

$D_1$

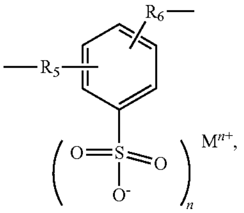

$E_1$

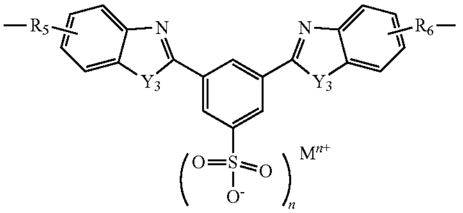

or

-continued

F1

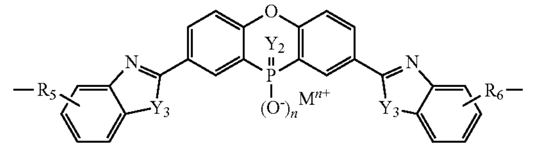

in formulae [$A_1$]-[$F_1$], $R_5$ and $R_6$ are the same or different and are any one of carbonyl, O atom or $$O-(CH_2)_a-O,$$

wherein a is an integer of 2 to 12; $R_7$ is $C_1$-$C_{12}$ alkyl, aryl or benzyl; $R_8$ is $C_1$-$C_8$ alkylene or arylene; $Y_2$ is O atom or S atom; $Y_3$ is any one of O atom, S atom, imino (HN<), methylimino ($CH_3N$<) or ethylimino ($C_2H_5N$<); M is any one of metal atoms Li, Na, K, Mg, Ca, Mn, Co, Ni, Ba, Fe, Cs or Zn; n is an integer of 1 to 3;

wherein the number of structural units of [III] is 1-99% of the number of structural units of [I], and the number of structural units of [IV] is 0-99% of the number of structural units of [1].

In one embodiment, the copolyester has intrinsic viscosity [η] of 0.20-3.50 dL/g, limiting oxygen index of 23.0-60.0%, and vertical combustion grade of V-2 to V-0.

In one embodiment, the number of structural units of [III] in the copolyester is 2-60% of the number of structural units of [I], and the number of structural units of [IV] in the copolyester is 0.1-60% of the number of structural units of [I]; the copolyester has intrinsic viscosity [η] of 0.30-3.20 dL/g, limiting oxygen index of 24.0-55.0% and vertical combustion grade of V-2 to V-0.

A second aspect of the present disclosure provides a method for preparing the above copolyester, which comprises: esterifying polyester monomers of diacid/diester and dihydric alcohol with a catalyst in proportion by direct esterification method or transesterification method, and then carrying out polycondensation reaction to obtain the copolyester product, wherein 1-99% of monomers derived from structural unit [III] and 0-99% of monomers derived from structural unit [IV] based on the molar number of diacid or diester in the polyester monomers are introduced into the reaction system before the esterification reaction or between the esterification reaction and the polycondensation reaction.

In one embodiment of the above preparation method, it is preferable to add 2-60% of monomers derived from structural unit [III] and 0.1-60% of monomers derived from structural unit [IV] based on the molar number of diacid or diester in the polyester monomers.

In one embodiment, the monomer derived from structural unit [III] used in the above preparation method is at least one of the following general structural formulae:

A'

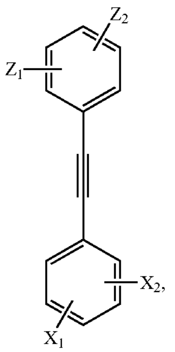

B'

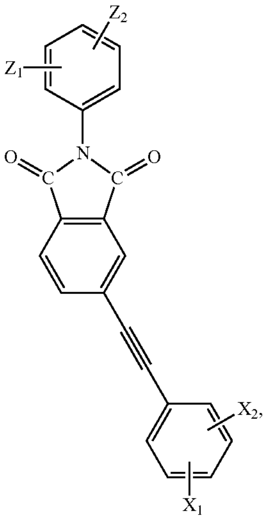

C'

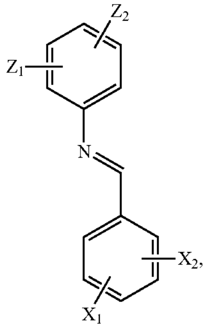

D'

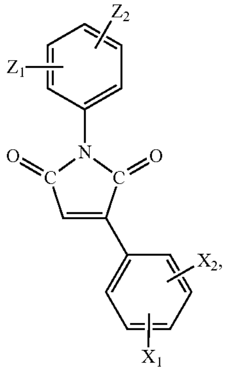

-continued
E′
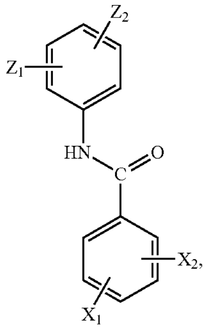
F′
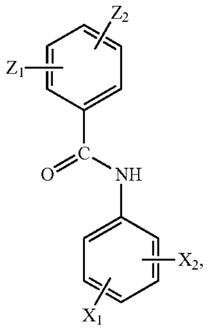
G′
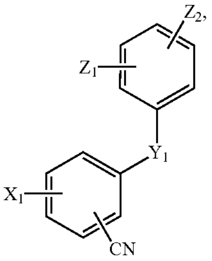
H′
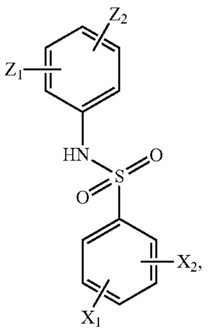
I′
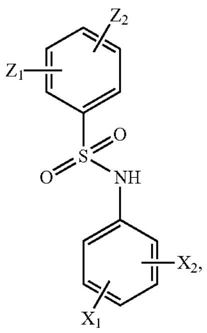
-continued
J′
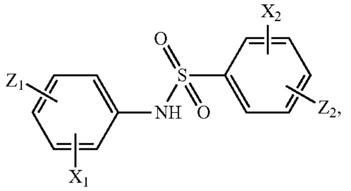
K′
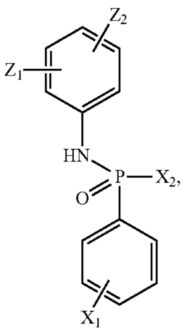
L′
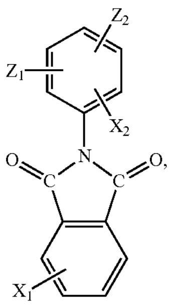
M′
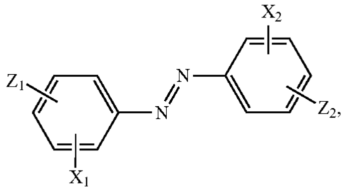
N′
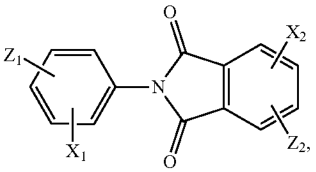
O′
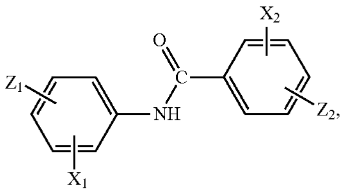
P′
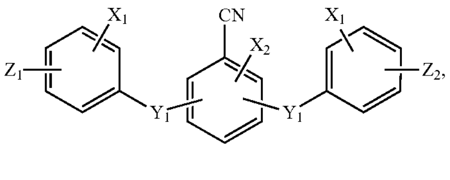

-continued

Q'

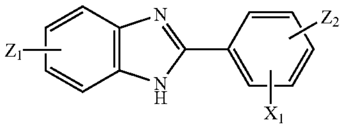

or

R'

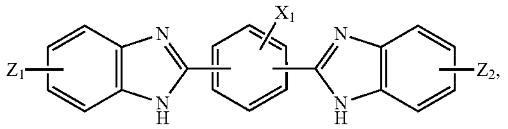

in the formulae, $Z_1$ and $Z_2$ are the same or different and are any one of carboxyl group, ester group, hydroxyl group or $$O-(CH_2)_a-OH,$$

wherein a is an integer of 2 to 12; $X_1$ and $X_2$ are the same or different and are any one of H atom, hydroxyl, methyl, ethyl, cyano, methoxy, phenylacetylenyl or phenyl; $Y_1$ is O atom or S atom.

In one embodiment, the monomer derived from structural unit [IV] used in the above preparation method is at least one of the following general structural formulae:

A1'

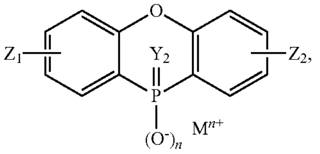

B1'

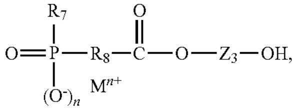

C1'

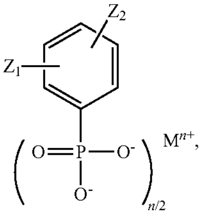

D1'

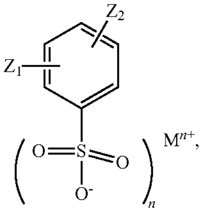

-continued

E1'

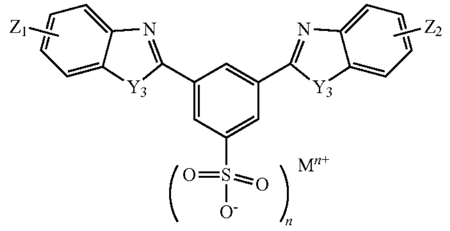

or

F1'

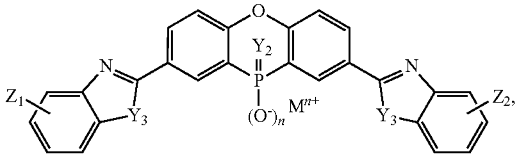

in the formulae, $Z_1$ and $Z_2$ are the same or different and are any one of carboxyl group, ester group, hydroxyl group or $$O-(CH_2)_a-OH,$$

wherein a is an integer of 2 to 12; $Z_3$ is $C_2$-$C_8$ alkylene; $R_7$ is $C_1$-$C_{12}$ alkyl, aryl or benzyl; $R_8$ is $C_1$-$C_8$ alkylene or arylene; $Y_2$ is O atom or S atom; $Y_3$ is any one of O atom, S atom, imino, methylimino or ethylimino; M is any one of metal atoms Li, Na, K, Mg, Ca, Mn, Co, Ni, Ba, Fe, Cs or Zn; n is an integer of 1 to 3.

In one embodiment, the above ester groups derived from the monomers of the structural units [III] and [IV] are any one of methyl ester group or ethyl ester group after esterification of monohydric alcohols, or ethylene glycol ester group, propylene glycol ester group, butanediol ester group, pentanediol ester group, glycerol ester group or pentaerythritol ester group after esterification of polyhydric alcohols.

The third aspect of the present disclosure provides a use of the above copolyester, which can not only be used alone in the fields of fibers, non-woven fabrics, engineering plastics, film materials, container materials, self-healing materials, shape memory materials or 3D printing materials, and can also be used as a functional additive for modification of polymer materials.

BRIEF DESCRIPTION OF THE DRAWINGS

In order to illustrate the technical solutions of the examples of the present disclosure more clearly, drawings of some examples and comparative examples will be briefly introduced below. Apparently, the drawings in the following description relate to only some examples of the present disclosure, rather than limiting the present disclosure.

DETAILED DESCRIPTION OF THE INVENTION

Figure 1:
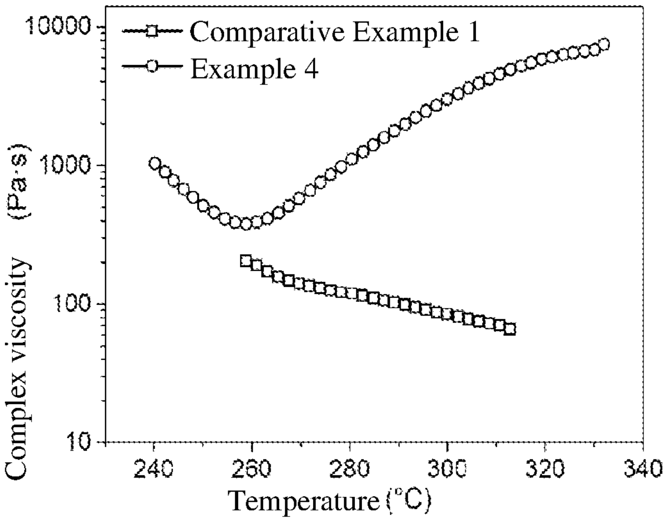
FIG. 1 shows a dynamic rheological diagram of copolyester prepared in Example 4 and pure PET prepared in Comparative Example 1 at variable temperature.

Unless otherwise defined, technical or scientific terms used in the present disclosure should have the ordinary meaning as understood by one of ordinary skill in the art to which this disclosure belongs.

The high-temperature self-crosslinking flame-retardant monomer in the present disclosure refers to a monomer that can undergo a chemical crosslinking reaction by itself or a chemical crosslinking reaction with polyester structural units. For example, the high-temperature self-crosslinking flame-retardant monomer is a monomer derived from the structural unit [III], i.e. the high-temperature self-crosslinking flame-retardant monomer is reacted to produce the structural unit [III] in the polymer. For example, the high-temperature self-crosslinking flame-retardant monomer is a diphenylacetylene monomer containing an unsaturated triple bond.

Ionic monomer in the present disclosure refers to an ionic monomer composed of organic anion and metal cation. For example, the ionic monomer is a monomer derived from structural unit [IV], i.e. the ionic monomer is reacted to produce structural unit [IV] in the polymer.

Diester in the present disclosure refers to an ester of diacid, such as dimethyl ester of diacid, or diethyl ester of diacid.

The term "aryl" refers to a cyclic aromatic hydrocarbon group having 1 to 3 aromatic rings, especially a monocyclic or bicyclic group, such as phenyl or naphthyl. Bicyclic or tricyclic aryl must contain at least one fully aromatic carbocyclic ring, but other fused ring may be aromatic or non-aromatic and may optionally contain a heteroatom, with the proviso that in the above case the point of attachment should be on an aromatic carbocyclic ring.

The term "arylene" refers to a divalent aryl group, i.e. an aryl group as defined above having two points of attachment to two other groups at any available point of attachment on the aryl ring, e.g. phenylene and naphthylene. An arylene group can also be substituted with any group suitable for substitution on an aryl group as defined herein.

The term "alkyl" or "alkylene" in the present disclosure is meant to include branched and straight chain saturated aliphatic hydrocarbon groups having a specified number of carbon atoms. For example, "$C_{1-8}$ alkyl (or alkylene)" is intended to include $C_1$, $C_2$, $C_3$, $C_4$, $C_5$, $C_6$, $C_7$, and $C_8$ alkyl (or alkylene). An alkyl group (or alkylene group) can be unsubstituted, or an alkyl group (or alkylene group) can be substituted wherein at least one hydrogen is replaced by another chemical group.

Surprisingly, the inventors found that the structure of the flame-retardant anti-dripping copolyester provided by the present disclosure can play a synergistic flame-retardant role during combustion because it not only has flame-retardant monomer (monomer derived from structural unit [III]) having high-temperature self-crosslinking effect, thereby effectively increasing the melt viscosity and melt strength of polyester when it is burned and thus inhibiting the generation of melt dripping, but also has ionic monomer (monomer derived from structural unit [IV]) that can produce "physical crosslinking" through "ionic aggregate" to increase the melt viscosity of polyester. The inventive copolyester has better flame-retardant and anti-dripping performances, compared with copolyesters containing only self-crosslinking functional group or only ionic group.

Under the synergistic action of high-temperature self-crosslinking flame-retardant monomer and ionic monomer, the copolyester of the present disclosure not only increases the melt viscosity and melt strength through chemical crosslinking and physical crosslinking at high temperature, but also greatly enhances the char-forming ability during combustion, thereby showing excellent flame-retardant and anti-dripping performances.

The following embodiments are included in the present disclosure:

1. A flame-retardant anti-dripping copolyester based on high-temperature self-crosslinking, wherein the copolyester is consisted of structural units represented by the following I, II, III and IV:

[I]

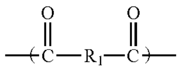

in the formula, $R_1$ represents an arylene group;

[II]

$$-\!(O-R_2-O)\!-$$

in the formula, $R_2$ represents an alkylene group;

[III]

A

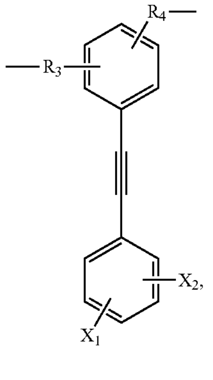

-continued
B
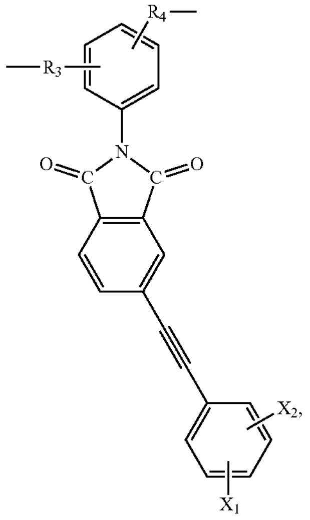
C
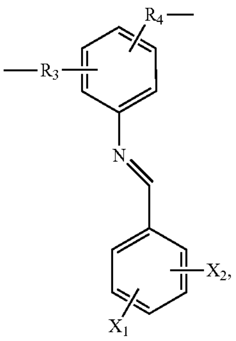
D
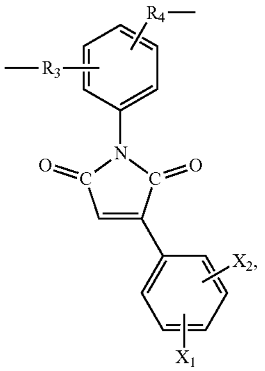
E
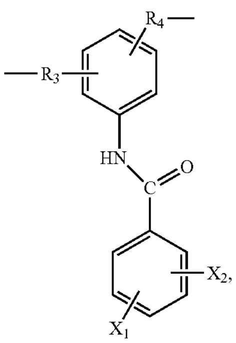
-continued
F
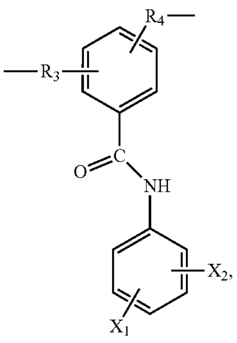
G
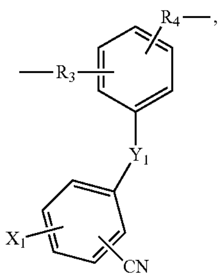
H
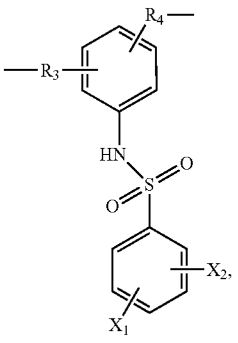
I
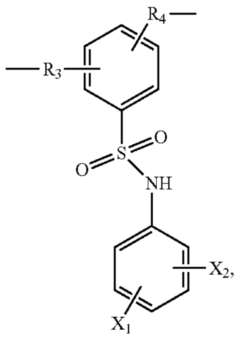
J
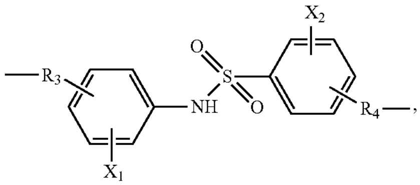

-continued
K
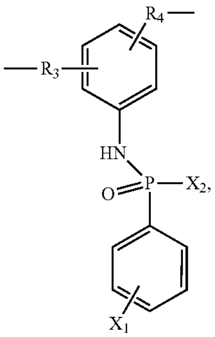
L
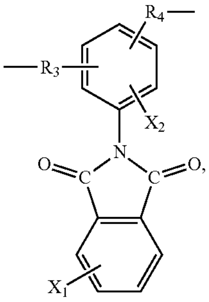
M
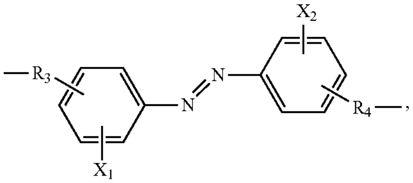
N
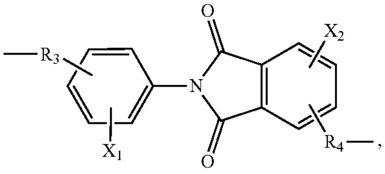
O
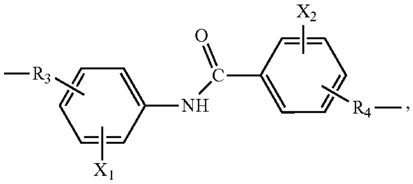
P
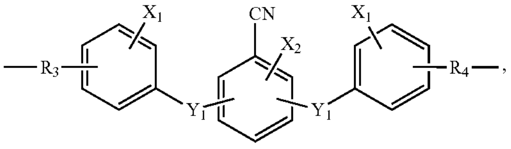
Q
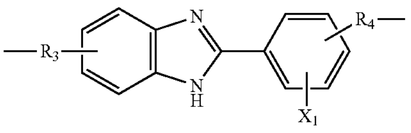
or
-continued
R
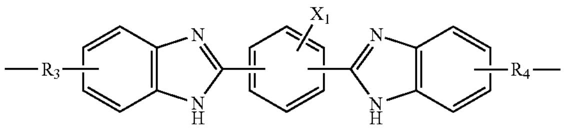
in the formulae, $R_3$ and $R_4$ are the same or different and are any one of carbonyl, O atom or
$$O{-}(CH_2)_a{-}O,$$
wherein a is an integer of 2 to 12; $X_1$ and $X_2$ are the same or different and are any one of H atom, hydroxyl, methyl, ethyl, cyano, methoxy, phenylacetylenyl or phenyl; $Y_1$ is O atom or S atom;
[IV]
$A_1$
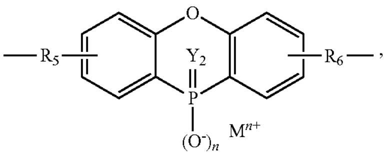
$B_1$
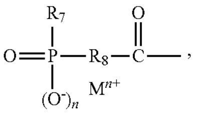
$C_1$
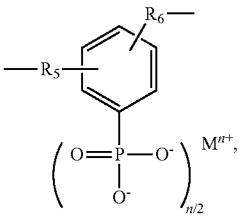
$D_1$
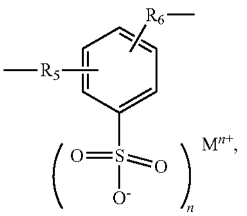
$E_1$
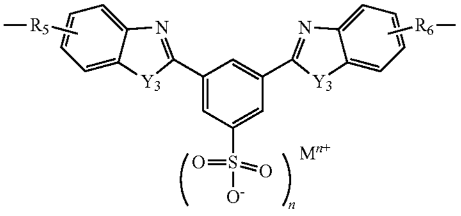
or -continued

F1

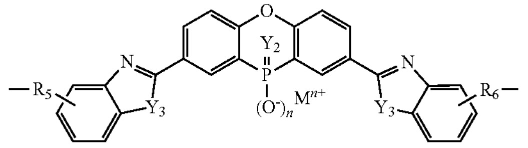

in the formulae, $R_5$ and $R_6$ are the same or different and are any one of carbonyl, O atom or $$O\text{—}(CH_2)_a\text{—}O,$$

wherein a is an integer of 2 to 12; $R_7$ is $C_1$-$C_{12}$ alkyl, aryl or benzyl; $R_8$ is $C_1$-$C_8$ alkylene or arylene; $Y_2$ is O atom or S atom; $Y_3$ is any one of O atom, S atom, imino, methylimino or ethylimino; M is any one of metal atoms Li, Na, K, Mg, Ca, Mn, Co, Ni, Ba, Fe, Cs or Zn, and n is an integer of 1 to 3;

the number of structural units of [III] is 1-99% of the number of structural units of [I], and the number of structural units of [IV] is 0-99% of the number of structural units of [I].

2. The flame-retardant anti-dripping copolyester based on high-temperature self-crosslinking according to Embodiment 1, wherein: the copolyester has intrinsic viscosity [η] of 0.20-3.50 dL/g, limiting oxygen index of 23.0-60.0%, and vertical combustion grade of V-2 to V-0.

3. The flame-retardant anti-dripping copolyester based on high-temperature self-crosslinking according to Embodiment 1, wherein: the number of structural units of [III] in the copolyester is 2-60% of the number of structural units of [I], and the number of structural units of [IV] in the copolyester is 0.1-60% of the number of structural units of [I]; the copolyester has intrinsic viscosity [η] of 0.30-3.20 dL/g, limiting oxygen index of 24.0-55.0%, and vertical combustion grade of V-2 to V-0.

4. A method for preparing the flame-retardant anti-dripping copolyester based on high-temperature self-crosslinking according to Embodiment 1, which comprises esterifying polyester monomers (diacid/diester and dihydric alcohol) with a catalyst in a conventional proportion by conventional direct esterification method or transesterification method, and then carrying out polycondensation reaction to obtain the copolyester product, wherein 1-99% of high-temperature self-crosslinking flame-retardant monomers and 0-99% of ionic monomers based on the molar number of diacid or diester in the polyester monomers are introduced into the reaction system before the esterification reaction or between the esterification reaction and the polycondensation reaction.

5. The method for preparing the flame-retardant anti-dripping copolyester based on high-temperature self-crosslinking according to Embodiment 4, wherein 2-60% of high-temperature self-crosslinking flame-retardant monomers and 0.1-60% of ionic monomers based on the molar number of diacid or diester in the polyester monomers are introduced.

6. The method for preparing the flame-retardant anti-dripping copolyester based on high-temperature self-crosslinking according to Embodiment 4 or 5, wherein the high-temperature self-crosslinking flame-retardant monomer used in the method is at least one of the following general structural formulae:

A′

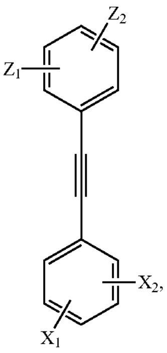

B′

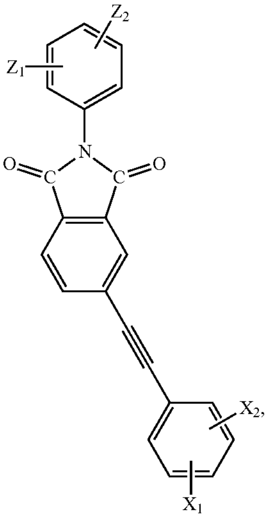

C′

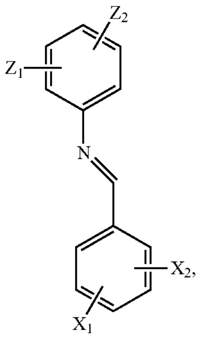

D′

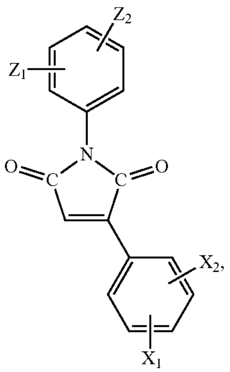

-continued
E'
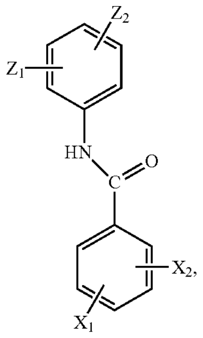
F'
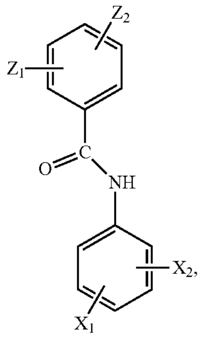
G'
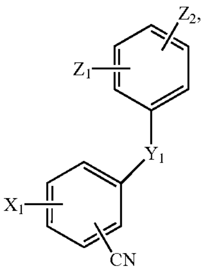
H'
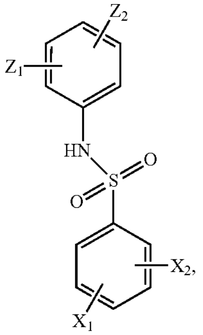
I'
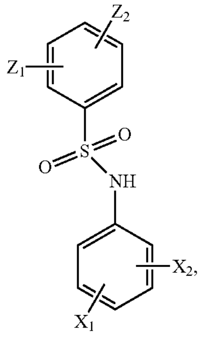
-continued
J'
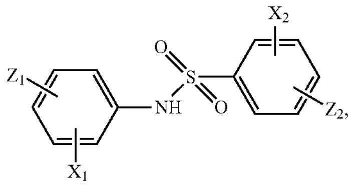
K'
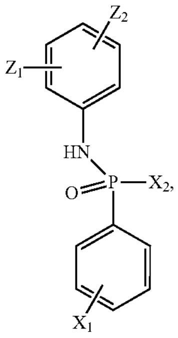
L'
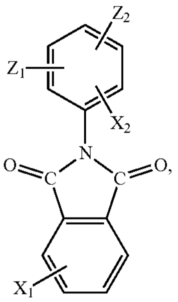
M'
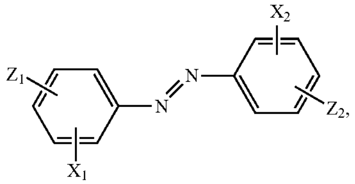
N'
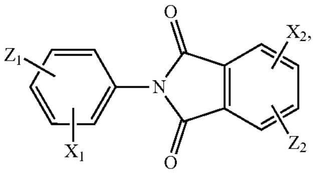
O'
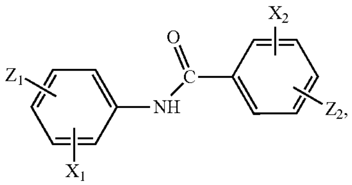
P'
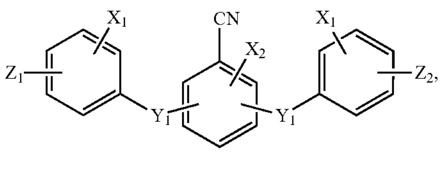

-continued

Q'

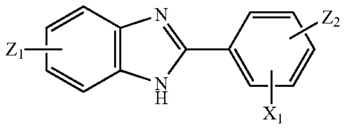

or

R'

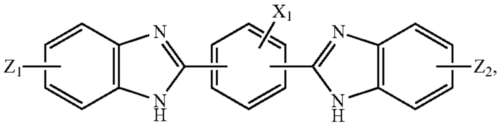

in the formulae, $Z_1$ and $Z_2$ are the same or different and are any one of carboxyl group, ester group, hydroxyl group or $$O-(CH_2)_a-OH,$$

wherein a is an integer of 2 to 12; $X_1$ and $X_2$ are the same or different and are any one of H atom, hydroxyl, methyl, ethyl, cyano, methoxy, phenylacetylenyl or phenyl; and $Y_1$ is O atom or S atom.

7. The method for preparing the flame-retardant anti-dripping copolyester based on high-temperature self-cross-linking according to Embodiment 4 or 5, wherein the ionic monomer used in the method is at least one of the following general structural formulae:

A1'

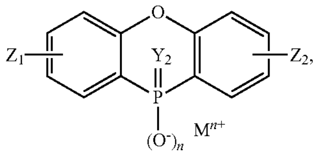

B1'

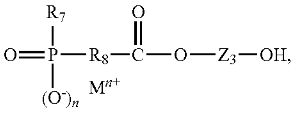

C1'

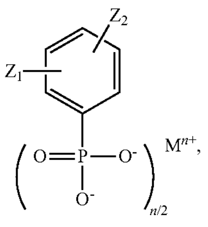

D1'

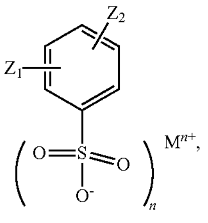

-continued

E1'

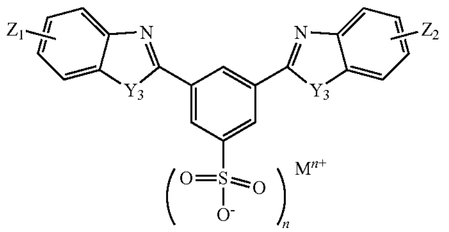

or

F1'

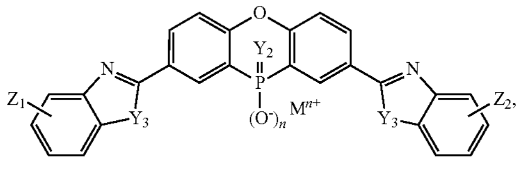

in the formulae, $Z_1$ and $Z_2$ are the same or different and are any one of carboxyl group, ester group, hydroxyl group or $$O-(CH_2)_a-OH,$$

wherein a is an integer of 2 to 12; $Z_3$ is $C_2$-$C_8$ alkylene; $R_7$ is $C_1$-$C_{12}$ alkyl, aryl or benzyl; $R_8$ is $C_1$-$C_8$ alkylene or arylene; $Y_2$ is O atom or S atom; $Y_3$ is any one of O atom, S atom, imino, methylimino or ethylimino; M is any one of metal atoms Li, Na, K, Mg, Ca, Mn, Co, Ni, Ba, Fe, Cs or Zn; and n is an integer of 1 to 3.

8. The method for preparing the flame-retardant anti-dripping copolyester based on high-temperature self-cross-linking according to Embodiment 6, wherein the ester group in the high-temperature self-crosslinking flame-retardant monomer used in the method is any one of methyl ester group or ethyl ester group after esterification of monohydric alcohols, or ethylene glycol ester group, propylene glycol ester group, butanediol ester group, pentanediol ester group, glycerol ester group or pentaerythritol ester group after esterification of polyhydric alcohols.

9. The method for preparing the flame-retardant anti-dripping copolyester based on high-temperature self-cross-linking according to Embodiment 7, wherein the ester group in the ionic monomer used in the method is any one of methyl ester group or ethyl ester group after esterification of monohydric alcohols, or ethylene glycol ester group, propylene glycol ester group, butanediol ester group, pentanediol ester group, glycerol ester group or pentaerythritol ester group after esterification of polyhydric alcohols.

10. An use of the flame-retardant anti-dripping copolyester based on high-temperature self-crosslinking according to Embodiment 1, which is used alone in the fields of fibers, non-woven fabrics, engineering plastics, film materials, container materials, self-healing materials, shape memory materials or 3D printing materials, or used as a functional additive for modification of polymer materials.

The present disclosure provides a copolyester comprising structural units represented by the following [I], [II], [III] and [IV]:
structural unit [I]
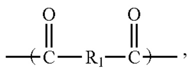
wherein $R_1$ represents an arylene group;
structural unit [II]
$$-\!(O-R_2-O)\!-,$$
wherein $R_2$ represents an alkylene group;
structural unit [III], which has a structure selected from formulae [A]-[R],
A
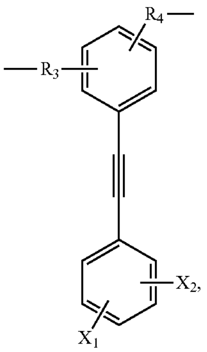
B
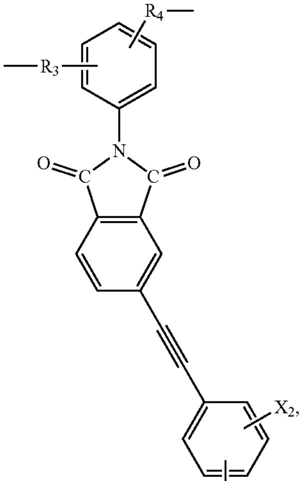
-continued
C
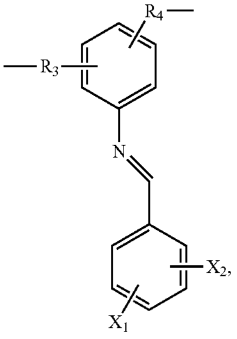
D
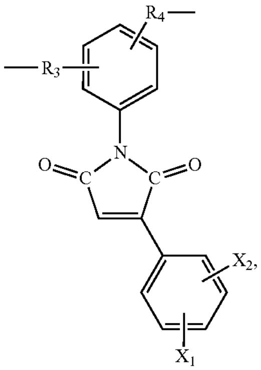
E
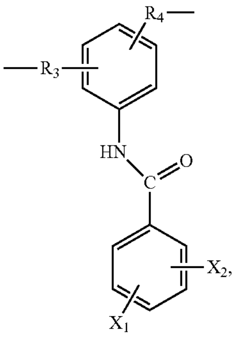
F
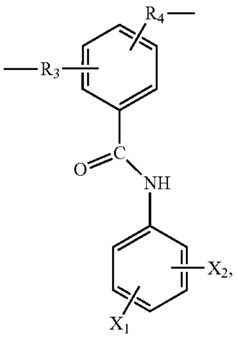

-continued
G
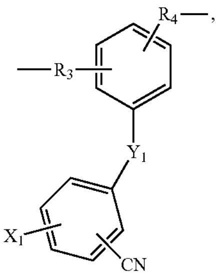
H
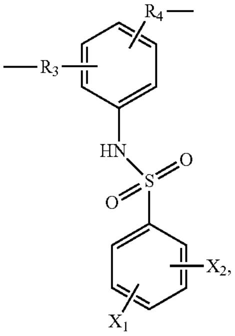
I
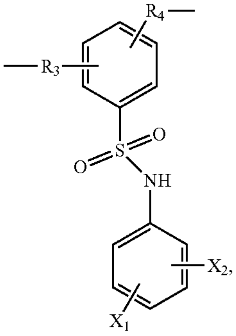
J
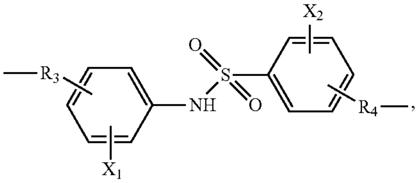
K
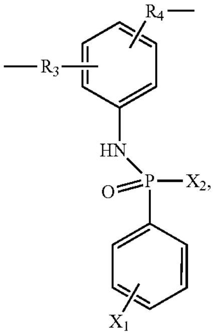
-continued
L
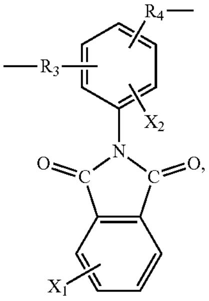
M
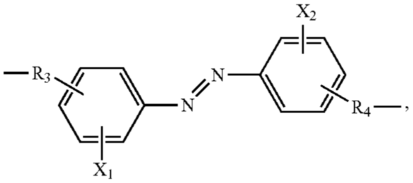
N
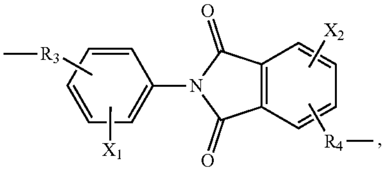
O
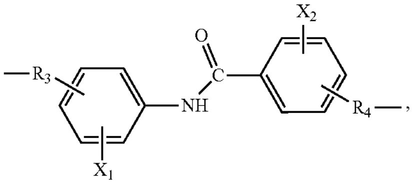
P
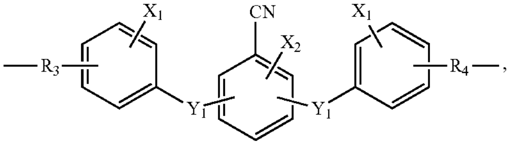
Q
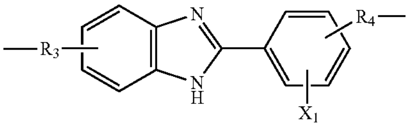
or
R
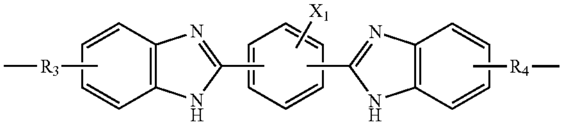
in formulae [A]-[R], $R_3$ and $R_4$ are the same or different and are any one of carbonyl, O atom or
$$O{-}(CH_2)_a{-}O,$$
wherein a is an integer of 2 to 12; $X_1$ and $X_2$ are the same or different and are any one of H atom, hydroxyl, methyl, ethyl, cyano, methoxy, phenylacetylenyl or phenyl; $Y_1$ is O atom or S atom;

structural unit [IV], which has a structure selected from formulae [$A_1$]-[$F_1$], $A_1$

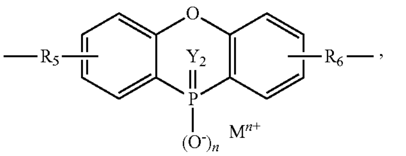

$B_1$

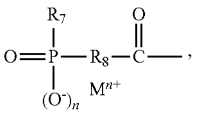

$C_1$

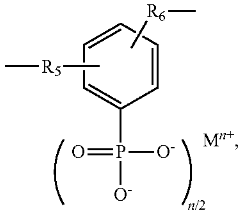

$D_1$

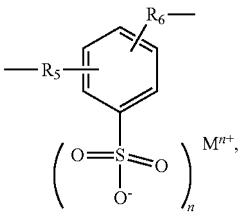

$E_1$

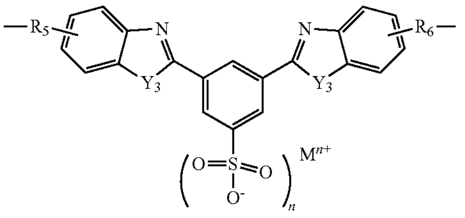

or $F_1$

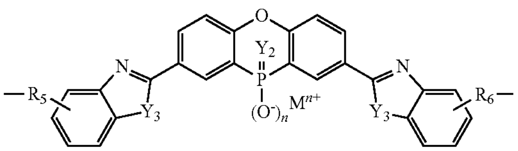

in formulae [$A_1$]-[$F_1$], $R_5$ and $R_6$ are the same or different and are any one of carbonyl, O atom or $$O-(CH_2)_a-O,$$

wherein a is an integer of 2 to 12; $R_7$ is $C_1$-$C_{12}$ alkyl, aryl or benzyl; $R_8$ is $C_1$-$C_8$ alkylene or arylene; $Y_2$ is O atom or S atom; $Y_3$ is any one of O atom, S atom, imino (HN<), methylimino ($CH_3N$<) or ethylimino ($C_2H_5N$<); M is any one of metal atoms Li, Na, K, Mg, Ca, Mn, Co, Ni, Ba, Fe, Cs or Zn; n is an integer of 1 to 3;

wherein the number of structural units of [III] is 1-99% of the number of structural units of [I], and the number of structural units of [IV] is 0-99% of the number of structural units of [I].

In a preferred embodiment, the number of structural units of [III] in the copolyester is 2-60% of the number of structural units of [I], and the number of structural units of [IV] in the copolyester is 0.1-60% of the number of structural units of [I].

In one embodiment, the copolyester has intrinsic viscosity [η] of 0.20-3.50 dL/g, limiting oxygen index of 23.0-60.0%, and vertical combustion grade of V-2 to V-0. Preferably, the copolyester has intrinsic viscosity [η] of 0.30-3.20 dL/g, limiting oxygen index of 24.0-55.0%, and vertical combustion grade of V-2 to V-0.

In one embodiment, the monomer containing an arylene group of $R_1$ is selected from terephthalic acid, isophthalic acid, o-phthalic acid, dimethyl terephthalate, dimethyl isophthalate, diethyl terephthalate, diethyl isophthalate, dipropyl terephthalate, dipropyl isophthalate, dibutyl terephthalate, dibutyl isophthalate, 2,6-naphthalenedicarboxylic acid, 2,7-naphthalenedicarboxylic acid, 1,4-naphthalenedicarboxylic acid, dimethyl 2,6-naphthalenedicarboxylate, dimethyl 2,7-naphthalenedicarboxylate, dimethyl 1,4-naphthalenedicarboxylate, etc.

In one embodiment, the monomer containing an alkylene group of $R_2$ is selected from ethylene glycol, propylene glycol (e.g., 1,3-propanediol), butanediol (e.g., 1,4-butanediol), pentanediol (e.g., neopentyl glycol), hexylene glycol, glycerol, pentaerythritol, etc.

In one embodiment, the monomer derived from structural unit [III] is selected from at least one of:

A′

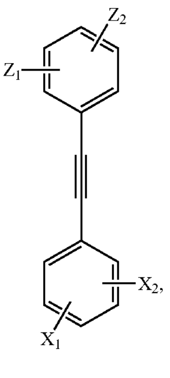

-continued
B′
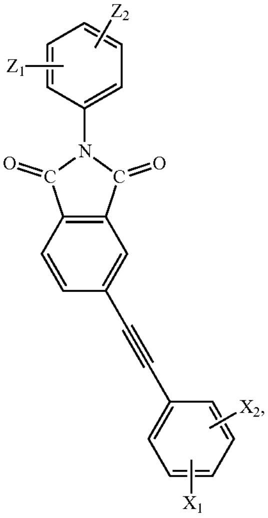
C′
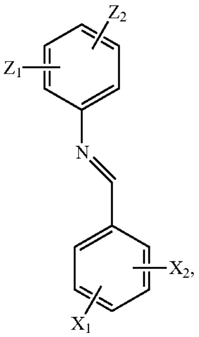
D′
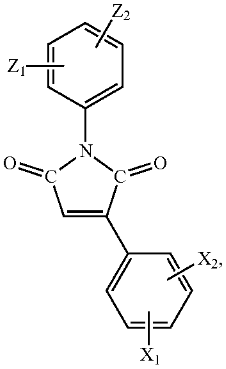
E′
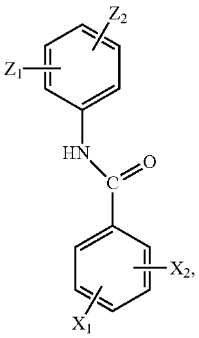
-continued
F′
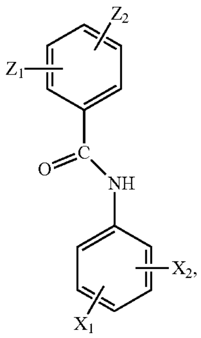
G′
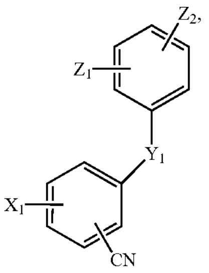
H′
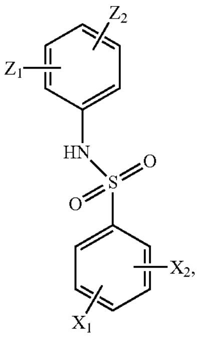
I′
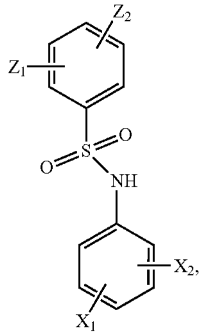
J′
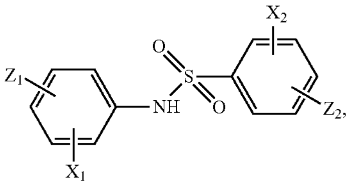

-continued

K'

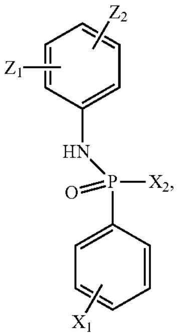

L'

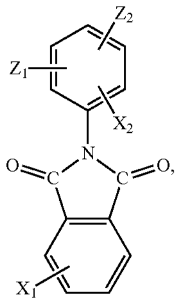

M'

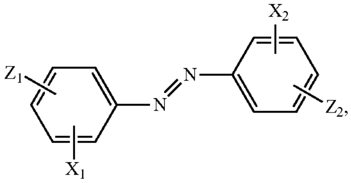

N'

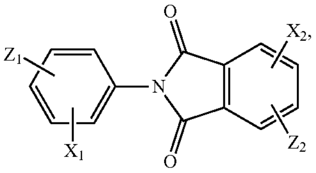

O'

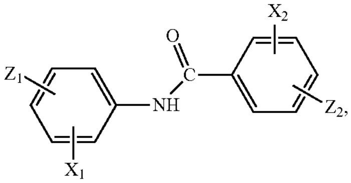

P'

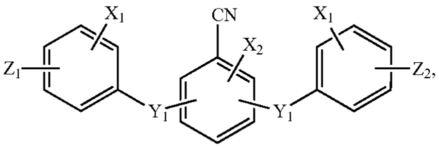

Q'

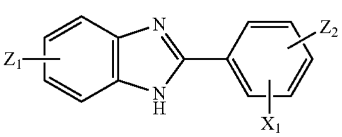

or

-continued

R'

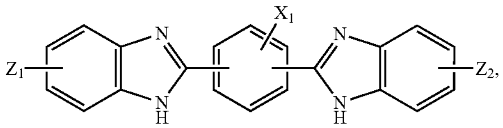

in the formulae, $Z_1$ and $Z_2$ are the same or different and are any one of carboxyl group, ester group, hydroxyl group or $$O-(CH_2)_a-OH,$$

wherein a is an integer of 2 to 12; $X_1$ and $X_2$ are the same or different and are any one of H atom, hydroxyl, methyl, ethyl, cyano, methoxy, phenylacetylenyl or phenyl; and $Y_1$ is O atom or S atom.

In one embodiment, the monomer derived from structural unit [IV] is selected from at least one of:

$A_1'$

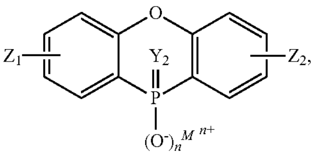

$B_1'$

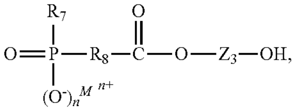

$C_1'$

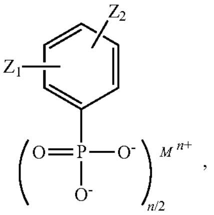

$D_1'$

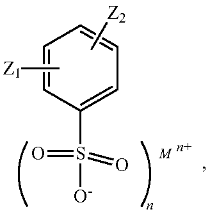

$E_1'$

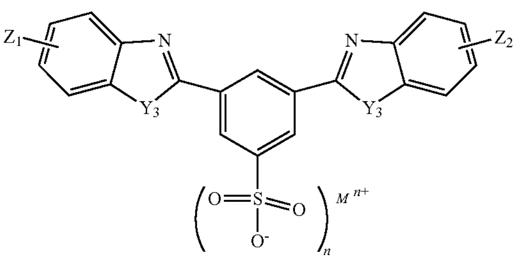

or

-continued $F_1'$

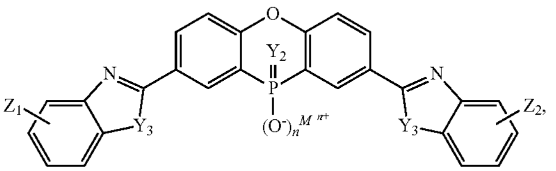

in the formulae, $Z_1$ and $Z_2$ are the same or different and are any one of carboxyl group, ester group, hydroxyl group or $$O-(CH_2)_a-OH,$$

wherein a is an integer of 2 to 12; $Z_3$ is $C_2$-$C_8$ alkylene; $R_7$ is $C_1$-$C_{12}$ alkyl, aryl or benzyl; $R_8$ is $C_1$-$C_8$ alkylene or arylene; $Y_2$ is O atom or S atom; $Y_3$ is any one of O atom, S atom, imino, methylimino or ethylimino; M is any one of metal atoms Li, Na, K, Mg, Ca, Mn, Co, Ni, Ba, Fe, Cs or Zn; and n is an integer of 1 to 3.

In one embodiment, the monomer derived from structural unit [III] is selected from at least one of: 4-(phenylacetylenyl)-1,2-benzenedicarboxylic acid, dimethyl 5-(phenylacetylenyl)-1,3-benzenedicarboxylate, dimethyl 5-(1,3-dioxo-5-(phenylethynyl)isoindolin-2-yl)isophthalate, dimethyl 5-benzamido-1,3-benzenedicarboxylate, 5-(1,3-dioxo-5-(phenylethynyl)isoindolin-2-yl)isophthalic acid, (E)-5-(benzylideneamino)benzene-1,3-diol, dimethyl (E)-5-(benzylideneamino)phenyl-1,3-benzenedicarboxylate, dimethyl 5-(2,5-dioxo-3-phenyl-2,5-dihydro-1H-pyrrol-1-yl)isophthalate, 1-(3,5-bis(2-hydroxyethoxy)phenyl)-3-phenyl-1H-pyrrole-2,5-dione, 5-benzamido-1,3-benzenedicarboxylic acid, N-(3,5-bis(2-hydroxyethoxy)phenyl)benzamide, 3,5-dihydroxy-N-phenylbenzamide, dimethyl 5-(3-cyanophenoxy)isophthalate, 3,5-bis(2-hydroxyethoxy)-N-phenylbenzamide, dimethyl 5-((diphenylphosphoryl)amino)isophthalate, methyl 2-(4-(methoxycarbonyl)phenyl)-1H-benzimidazole-5-carboxylate, N-(3-cyanophenyl)-3,5-bis(2-hydroxyethoxy)benzamide, dimethyl 5-phthalimido-1,3-benzenedicarboxylate, dimethyl 5-(4-cyanophenoxy)isophthalate, 4-(3,5-bis(2-hydroxyethoxy)phenoxy)benzonitrile, 5-(benzenesulfonamido)isophthalic acid, N-(3,5-dihydroxyphenyl)benzenesulfonamide, dimethyl 5-(N-phenylsulfamoyl)isophthalate, dimethyl 5-phthalimido-1,3-benzenedicarboxylate, methyl 4-(N-(4-(methoxycarbonyl)phenyl)sulfamoyl)benzoate, methyl 2-cyano-4-((4-(methoxycarbonyl)phenyl)sulfonamido)benzoate, azobenzene-4,4'-dicarboxylic acid, methyl 2-(4-(methoxycarbonyl)-2-methylphenyl)-1,3-dioxoisoindoline-5-carboxylate, dimethyl 4,4'-((5-cyano-1,3-phenylene)bis(oxy))dibenzoate, dimethyl 4,4'-((2-cyano-1,3-phenylene)bis(oxy))dibenzoate, methyl 3-cyano-5-((4-(methoxycarbonyl)phenyl)carbamoyl)benzoate, 2,2'-(1,4-phenylene)bis(methyl 1H-benzimidazole-5-carboxylate), 4-((4-cyanophenyl)acetylenyl)-1,2-benzenedicarboxylic acid, dimethyl (E)-5-((4-cyanobenzylidene)amino)phenyl-1,3-benzenedicarboxylate, etc.

In one embodiment, the monomer derived from structural unit [IV] is selected from at least one of: potassium 2,8-bis((2-hydroxyethoxy)carbonyl)phenoxaphosphinin-10-olate 10-oxide, sodium (3-(2-hydroxyethoxy)-3-oxopropyl)(phenyl)phosphinate, potassium (3,5-bis(methoxycarbonyl)phenyl)phosphonate, sodium 3,5-dicarboxybenzenesulfonate, sodium 2,8-bis((2-hydroxyethoxy)carbonyl)phenoxaphosphinin-10-olate 10-oxide, sodium 3,5-bis(6-(methoxycarbonyl)-1H-benzimidazol-2-yl)benzenesulfonate, sodium 2,8-bis(5-(methoxycarbonyl)-1H-benzo[d]imidazol-2-yl) phenoxaphosphinin-10-olate 10-oxide, potassium 3,5-dicarboxybenzenesulfonate, magnesium (3-(2-hydroxyethoxy)-3-oxopropyl(phenyl)phosphinate, sodium (3,5-bis(methoxycarbonyl)phenyl)phosphonate, potassium 3,5-bis(6-(methoxycarbonyl)-1H-benzimidazol-2-yl)benzenesulfonate, potassium 2,8-bis((2-hydroxyethoxy)carbonyl) phenoxaphosphinin-10-olate 10-oxide, potassium (3-(2-hydroxyethoxy)-3-oxopropyl)(phenyl)phosphinate, potassium (3,5-bis(methoxycarbonyl)phenyl)phosphonate, sodium 3,5-bis(6-(methoxycarbonyl)-1H-benzimidazol-2-yl)benzenesulfonate, sodium (3-(2-hydroxyethoxy)-3-oxopropyl) (phenyl)phosphinate, sodium 3,5-dihydroxybenzenesulfonate, potassium 3,5-bis(6-(methoxycarbonyl)-1H-benzimidazol-2-yl)benzenesulfonate, sodium 2,8-bis(5-(methoxycarbonyl)-1H-benzo[d]imidazol-2-yl) phenoxaphosphinin-10-olate 10-oxide, etc.

The high-temperature self-crosslinking flame-retardant monomers used in the above methods can be prepared with reference to the methods disclosed in *Journal of Materials Chemistry,* 2012, 22, 19849-19857*; Polymer Chemistry,* 2016, 7, 2698-2708*; Chemical Engineering Journal,* 2019, 374, 694-705, etc.; the ionic monomers used in the above methods can be prepared with reference to the methods disclosed in *Polymer Chemistry,* 2014, 5, 1982-1991*; Polymer,* 2015, 60, 50-61, etc.

In one embodiment, the ester group in the high-temperature self-crosslinking flame-retardant monomer and the ionic monomer is any one of methyl ester group or ethyl ester group after esterification of monohydric alcohols, or ethylene glycol ester group, propylene glycol ester group, butanediol ester group, pentanediol ester group, glycerol ester group or pentaerythritol ester group after esterification of polyhydric alcohols.

The detailed process steps and conditions of the conventional direct esterification method or transesterification method used in the present disclosure are as follows:

Direct esterification method: diacid, dihydric alcohol, catalyst, high-temperature self-crosslinking flame-retardant monomer and ionic monomer are added in a reaction kettle in proportion; the mixture is subjected to esterification reaction for 2-5 hours by being heated to 190-240° C. under increased pressure; after the esterification, a polycondensation reaction is carried out at 240-250° C. under low vacuum for 0.5-2 hours, and then a polycondensation reaction is carried out at 250-280° C. under high vacuum for 1-4 hours. The melt of copolymer is extruded with an inert gas (preferably nitrogen) and cooled with water to obtain the target copolyester. In the method, the high-temperature self-crosslinking flame-retardant monomer and ionic monomer can be added to the reaction kettle before the esterification reaction or between the esterification reaction and the polycondensation reaction.

Transesterification method: diester, dihydric alcohol, catalyst, high-temperature self-crosslinking flame-retardant monomer and ionic monomer are added in a reaction kettle in proportion; a transesterification reaction is carried out at 180-220° C. under normal pressure for 3-6 hours; after the transesterification, a polycondensation reaction is carried out at 240-250° C. under low vacuum for 0.5-2 hours, and then a polycondensation reaction is carried out at 250-280° C. under high vacuum for 1-4 hours. The melt of copolymer is extruded with an inert gas (preferably nitrogen) and cooled with water to obtain the target copolyester. In the method, the high-temperature self-crosslinking flame-retardant monomer and ionic monomer can be added to the reaction kettle before transesterification reaction or between transesterification reaction and polycondensation reaction.

The catalyst selected in the preparation method is at least one of germanium-based catalysts, titanium-based catalysts, antimony-based catalysts, aluminum-based catalysts, tin-based catalysts, etc.; for example germanium dioxide, antimony acetate, antimony trioxide, antimony glycolate, titanium oxide, potassium titanium oxalate, potassium hexafluorotitanate, titanate, titanium alkoxide, titanium complex, tin oxide, aluminum hydroxide, aluminum acetate, silicon dioxide, zinc acetate, manganese acetate or magnesium acetate, etc.

The above flame-retardant anti-dripping copolyester based on high-temperature self-crosslinking provided by the present disclosure may not only be used alone in the fields of fibers, non-woven fabrics, engineering plastics, film materials, container materials, self-healing materials, shape memory materials or 3D printing materials, but also be used as a functional additive for the modification of polymer materials.

Compared with the prior art, the present disclosure has one or more of the following advantages:

1. The structural units of the flame-retardant anti-dripping copolyester provided by the present disclosure contain a structure that can be self-crosslinked at high-temperature. Such self-crosslinking structure is stable and will not be crosslinked during the polymerization process and processing, but can be rapidly crosslinked at higher temperature or upon burning (FIG. 1). On the one hand, the crosslinking reaction greatly increases the melt viscosity/strength of the polyester during combustion, thereby inhibiting the generation of melt dripping; on the other hand, the aromatic fused ring structure formed by crosslinking will further form a stable and dense char layer, which plays the role of insulation of heat, insulation of oxygen, and inhibition of volatilization of combustible substances, thereby endowing the copolyester with excellent flame-retardant properties.

2. The structure of the flame-retardant anti-dripping copolyester provided by the present disclosure can play a synergistic flame-retardant role during combustion because it not only has flame-retardant monomer having high-temperature self-crosslinking effect, thereby effectively increasing the melt viscosity and melt strength of the polyester when it is burned and thus inhibiting the generation of melt dripping, but also has ionic monomer that can produce "physical crosslinking" through "ionic aggregate" to increase the melt viscosity of the polyester. The inventive copolyester has better flame-retardant and anti-dripping performances, compared with copolyesters containing only self-crosslinking functional group or only ionic group.

3. The flame-retardant anti-dripping copolyester provided by the present disclosure also has good char-forming ability, and thus the copolyester can form a stable and dense char layer during combustion. The char layer can effectively inhibit the volatilization of organic smoke, and thus the copolyester exhibits good smoke suppression effect, which is not possessed by most flame-retardant polyesters.

4. The structure of the flame-retardant anti-dripping copolyester provided by the present disclosure contains ionic group, and thus the copolyester has good antistatic properties and affinity with cationic dyes.

5. The structure of the flame-retardant anti-dripping copolyester provided by the present disclosure contains conjugated aromatic groups between which π-π stacking interactions can be formed. The π-π stacking as a dynamic crosslinking point can not only endow the copolyester with certain self-healing and shape memory properties, but also increase the mechanical strength and inter-melt adhesion of the copolyester. Therefore, the copolyester can be used as a smart polymer material and 3D printing material.

6. The flame-retardant anti-dripping copolyester provided by the present disclosure is not introduced with any additives that affect the preparation of fibers, and thus has good spinnability. The copolyester can not only be directly used as a copolyester for fibers, but also be used as a macromolecular compatibilizer for incompatible polymer blend system, which can improve the mechanical properties of materials and endow the materials with flame-retardant and anti-dripping properties at the same time.

7. The flame-retardant anti-dripping copolyester provided by the present disclosure does not contain halogen element in the structure, and thus is an environment-friendly green polymer material.

8. The preparation method of the copolyester provided by the present disclosure is basically the same as the conventional synthetic method of polyesters, and thus the technology is mature, the equipment has high portability, operation is simple, and control and industrial production are easy.

The following examples are given to further illustrate the present disclosure in detail, but the embodiments of the present disclosure are not limited thereto. It is necessary to point out that the following examples should not be construed as limiting the protection scope of the present disclosure. If those skilled in the art make some non-essential improvements and adjustments to the present disclosure according to the present disclosure, they still fall within the protection scope of the present disclosure.

Testing Method

Test method for complex viscosity of copolyester: TA DHR-2 rotational rheometer was used. The copolyester sample was a sheet with a diameter of 25 mm and a thickness of 1 mm. The shear rate of the test was 1 rad $s^{-1}$, and the heating rate was 5° C. $min^{-1}$. The higher the complex viscosity of the copolyester at high temperature, the higher the melt viscosity and melt strength during combustion, and the stronger the corresponding anti-dripping ability.

Thermogravimetric analysis of copolyester: The thermal stability of copolyester under nitrogen atmosphere and air atmosphere was tested using a NETZSCH TG 209 F1 thermogravimetric analyzer (TGA) with a heating rate of 10 K/min and a test temperature range of 40-700° C.

Copolyesters were all formulated into a solution with a concentration of 5 g/L using phenol/1,1,2,2-tetrachloroethane (1:1, v:v) as a solvent and tested for intrinsic viscosity [η] at 25° C. with a Ubbelohde viscometer.

Copolyesters were all made into strips of 120×6.5×3.2 $mm^3$ for standard oxygen index test and tested for limiting oxygen index on a HC-2 oxygen index meter according to ASTM D2863-97 standard. The limiting oxygen index (LOI) characterizes the self-extinguishing ability of materials. The higher the LOI value, the better the flame-retardant performance of materials. In general, materials with a LOI greater than 26% are considered self-extinguishing.

Vertical burning test: Copolyester was made into a standard strip of 125×12.7×3.2 $mm^3$, and tested with a CZF-2 vertical burning instrument (UL-94) according to the UL-94 standard. The test grade is divided into no grade, grade V-2, grade V-1 and grade V-0. No grade means that the material is extremely flammable, and the flame-retardant performance of the material is: V-2 grade<V-1 grade<V-0 grade.

The heat release rate (HRR) and total smoke release TSR of copolyester were tested using cone calorimetry. The cone calorimetry test was made by making the copolyester into a standard sample of 100×100×3 $mm^3$, and testing in a FTT cone calorimeter with a power of 50 $kW/m^2$ according to ISO 5660-1 standard. The heat release rate (HRR), especially the peak heat release rate (p-HRR), is an important parameter for judging flame-retardant properties of materials in the cone calorimetry test, wherein the lower the value, the better the flame retardancy of the material, and vice versa. The smaller the TSR, the smaller the smoke release of the material in a fire.

Example 1

498.0 g of terephthalic acid, 220.0 g of ethylene glycol, 7.98 g of 4-(phenylacetylenyl)-1,2-benzenedicarboxylic acid, 36.6 g of potassium 2,8-bis((2-hydroxyethoxy)carbonyl)phenoxaphosphinin-10-olate 10-oxide, and 0.3 g of antimony trioxide were added to a reaction kettle, which was filled with nitrogen gas to remove the air in the kettle. The system was pressurized to 0.1 MPa, and heated to 240° C. within 2 hours to start the esterification reaction. The pressure in the kettle was controlled to be 0.3-0.4 MPa. After maintaining for 2 to 4 hours, the pressure began to decrease to normal pressure, and the esterification reaction was completed. Polycondensation reaction was then carried out at 240° C. under low vacuum for 0.5 to 2 hours. The temperature was then raised to 250 to 270° C., and polycondensation reaction was then carried out under high vacuum (pressure <80 Pa) for 1 to 4 hours. The material was discharged and cooled with water.

The intrinsic viscosity [η] of the copolyester was 0.85 dL/g; the limiting oxygen index was 27.0%; the vertical combustion grade was V-2; the peak heat release rate p-HRR in the cone calorimetry test was 320 $kW/m^2$, the total smoke release TSR was 683 $m^2/m^2$.

Example 2

582.0 g of dimethyl terephthalate, 400.0 g of ethylene glycol, 159.6 g of 4-(phenylacetylenyl)-1,2-benzenedicarboxylic acid, 25.2 g of sodium (3-(2-hydroxyethoxy)-3-oxopropanyl)(phenyl)phosphinate, 0.2 g of manganese acetate and 0.25 g of germanium dioxide were added to a reaction kettle, and nitrogen was charged to remove the air in the kettle. The reaction was carried out at 180-220° C. under normal pressure for 2-6 hours, and the transesterification reaction was completed. Polycondensation reaction was then carried out at 240-250° C. under low vacuum for 0.5 to 2 hours, and then carried out at 250 to 270° C. under high vacuum (pressure<80 Pa) for 1 to 4 hours. The material was discharged and cooled with water.

The intrinsic viscosity [η] of the copolyester was 0.62 dL/g; the limiting oxygen index was 30.5%; the vertical combustion grade was V-2; the peak heat release rate p-HRR in the cone calorimetry test was 312 $kW/m^2$, the total smoke release TSR was 801 $m^2/m^2$.

Example 3

388.0 g of dimethyl terephthalate, 194 g of dimethyl isophthalate, 400.0 g of ethylene glycol, 79.8 g of 4-(phenylacetylenyl)-1,2-benzenedicarboxylic acid, 52.5 g of potassium (3,5-bis(methoxycarbonyl)phenyl)phosphonate, 40.2 g of sodium 3,5-dicarboxybenzenesulfonate, and 0.28 g of isopropyl titanate were added to a reaction kettle, and esterification and polycondensation were carried out according to the steps and conditions of Example 2. The material was then discharged.

The intrinsic viscosity [η] of the copolyester was 0.90 dL/g; the limiting oxygen index was 31.0%; the vertical combustion grade was V-0, and no melt dripping was produced in the test; p-HRR in the cone calorimetry test was 222 $kW/m^2$, and TSR was 640 $m^2/m^2$.

Example 4

498.0 g of terephthalic acid, 220.0 g of ethylene glycol, 159.6 g of 4-(phenylacetylenyl)-1,2-benzenedicarboxylic acid, 38.7 g of sodium 2,8-bis((2-hydroxyethoxy)carbonyl)phenoxaphosphinin-10-olate 10-oxide, 0.2 g of zinc acetate and 0.3 g of antimony trioxide were added to a reaction kettle, and esterification and polycondensation were carried out according to the steps and conditions given in Example 1. The material was then discharged.

The intrinsic viscosity [η] of the copolyester was 0.88 dL/g; the limiting oxygen index was 31.0%; the vertical combustion grade was V-0, and no melt dripping was produced in the test; p-HRR in the cone calorimetry test was 298 $kW/m^2$, and TSR was 728 $m^2/m^2$.

Example 5

415.0 g of terephthalic acid, 83.0 g of 1,2-benzenedicarboxylic acid, 220.0 g of ethylene glycol, 176.4 g of dimethyl 5-(phenylacetylenyl)-1,3-benzenedicarboxylate, 47.5 g of sodium 3,5-di(6-(methoxycarbonyl)-1H-benzimidazol-2-yl)benzenesulfonate, 65.9 g of dimethyl 5-(1,3-dioxo-5-(phenylethynyl)isoindolin-2-yl)isophthalate, 9.4 g of dimethyl 5-benzamido-1,3-benzenedicarboxylate, 0.1 g of antimony acetate and 0.2 g of titanium glycolate were added to a reaction kettle, and esterification and polycondensation were carried out according to the steps and conditions given in Example 1. The material was then discharged.

The intrinsic viscosity [η] of the copolyester was 0.70 dL/g; the limiting oxygen index was 32.0%; the vertical combustion grade was V-0, and no melt dripping was produced in the test; p-HRR in the cone calorimetry test was 238 $kW/m^2$, and TSR was 709 $m^2/m^2$.

Example 6

498.0 g of terephthalic acid, 220.0 g of ethylene glycol, 88.2 g of dimethyl 5-(phenylacetylenyl)-1,3-benzenedicarboxylate, 1.8 g of sodium 2,8-bis(5-(methoxycarbonyl)-1H-benzo[d]imidazol-2-yl)phenoxaphosphinin-10-olate 10-oxide and 0.25 g of titanium tartrate were added to a reaction kettle, and esterification and polycondensation were carried out according to the steps and conditions given in Example 1. The material was then discharged.

The intrinsic viscosity [η] of the copolyester was 1.27 dL/g; the limiting oxygen index was 30.0%; the vertical combustion grade was V-2; p-HRR in the cone calorimetry test was 434 $kW/m^2$, and TSR was 1473 $m^2/m^2$.

Example 7

582.0 g of dimethyl terephthalate, 400.0 g of ethylene glycol, 65.9 g of dimethyl 5-(1,3-dioxo-5-(phenylethynyl)isoindolin-2-yl)isophthalate, 38.7 g of sodium 2,8-bis((2-hydroxyethoxy)carbonyl)phenoxaphosphinin-10-olate 10-oxide and 0.3 g of tetrabutyl titanate were added to a reaction kettle, and esterification and polycondensation were carried out according to the steps and conditions given in Example 2. The material was then discharged.

The intrinsic viscosity [η] of the copolyester was 0.80 dL/g; the limiting oxygen index was 29.4%; the vertical combustion grade was V-2; p-HRR in the cone calorimetry test was 266 kW/$m^2$, and TSR was 770 $m^2/m^2$.

Example 8

498.0 g of terephthalic acid, 220.0 g of ethylene glycol, 131.7 g of dimethyl 5-(1,3-dioxo-5-(phenylethynyl)isoindolin-2-yl)isophthalate, 28.6 g of sodium (3,5-bis(methoxycarbonyl)phenyl)phosphonate, 25.5 g of sodium (3-(2-hydroxyethoxy)-3-oxopropyl)(phenyl)phosphinate, 0.2 g of magnesium acetate and 0.2 g of titanium dioxide were added to a reaction kettle, and esterification and polycondensation were carried out according to the steps and conditions given in Example 1. The material was then discharged.

The intrinsic viscosity [η] of the copolyester was 0.95 dL/g; the limiting oxygen index was 33.0%; the vertical combustion grade was V-0, and no melt dripping was produced in the test; p-HRR in the cone calorimetry test was 248 kW/$m^2$, and TSR was 690 $m^2/m^2$.

Example 9

498.0 g of terephthalic acid, 220.0 g of ethylene glycol, 123.3 g of 5-(1,3-dioxo (phenylethynyl)isoindolin-2-yl) isophthalic acid, 42.6 g of potassium 3,5-dicarboxybenzenesulfonate, and 0.3 g of antimony glycolate were added to a reaction kettle, and esterification and polycondensation were carried out according to the steps and conditions given in Example 1. The material was then discharged.

The intrinsic viscosity [η] of the copolyester was 0.76 dL/g; the limiting oxygen index was 34.6%; the vertical combustion grade was V-0, and no melt dripping was produced in the test; p-HRR in the cone calorimetry test was 202 kW/$m^2$, and TSR was 688 $m^2/m^2$.

Example 10

498.0 g of terephthalic acid, 220.0 g of ethylene glycol, 369.9 g of 5-(1,3-dioxo-5-(phenylethynyl)isoindolin-2-yl) isophthalic acid, 180.6 g of sodium 2,8-bis(5-(methoxycarbonyl)-1H-benzo[d]imidazol-2-yl)phenoxaphosphinin-10-olate 10-oxide and 0.3 g of tetrabutyl titanate were added to a reaction kettle, and esterification and polycondensation were carried out according to the steps and conditions given in Example 1. The material was then discharged.

The intrinsic viscosity [η] of the copolyester was 0.84 dL/g; the limiting oxygen index was 46.0%; the vertical combustion grade was V-0, and no melt dripping was produced in the test; p-HRR in the cone calorimetry test was 186 kW/$m^2$, and TSR was 440 $m^2/m^2$.

Example 11

415.0 g of terephthalic acid, 53.0 g of isophthalic acid, 30.0 g of 1,2-benzenedicarboxylic acid, 220.0 g of ethylene glycol, 95.9 g of (E)-5-(benzylideneamino)benzene-1,3-diol, 16.1 g of magnesium (3-(2-hydroxyethoxy)-3-oxopropyl(phenyl)phosphinate, 12.9 g of sodium 2,8-bis((2-hydroxyethoxy)carbonyl)phenoxaphosphinin-10-olate 10-oxide, 9.5 g of sodium (3,5-bis(methoxycarbonyl)phenyl)phosphonate, 0.27 g of titanium dioxide and 0.03 g of silicon dioxide were added to a reaction kettle, and esterification and polycondensation were carried out according to the steps and conditions given in Example 1. The material was then discharged.

The intrinsic viscosity [η] of the copolyester was 0.60 dL/g; the limiting oxygen index was 32.5%; the vertical combustion grade was V-0, and no melt dripping was produced in the test; p-HRR in the cone calorimetry test was 482 kW/$m^2$, and TSR was 917 $m^2/m^2$.

Example 12

498.0 g of terephthalic acid, 200.0 g of ethylene glycol, 44.6 g of dimethyl (E)-5-(benzylideneamino)phenyl-1,3-benzenedicarboxylate, 19.1 g of sodium (3,5-bis-(methoxycarbonyl)phenyl)phosphonate, 0.15 g of zinc acetate, 0.3 g of alumina and 0.1 g of silicon dioxide were added to a reaction kettle, and esterification and polycondensation were carried out according to the steps and conditions given in Example 1. The material was then discharged.

The intrinsic viscosity [η] of the copolyester was 0.75 dL/g; the limiting oxygen index was 29.5%; the vertical combustion grade was V-2; p-HRR in the cone calorimetry test was 412 kW/$m^2$, and TSR was 1055 $m^2/m^2$.

Example 13

388.0 g of dimethyl terephthalate, 194.0 g of dimethyl isophthalate, 400.0 g of ethylene glycol, 178.2 g of dimethyl (E)-5-(benzylideneamino)phenyl-1,3-benzenedicarboxylate, 81.6 g of potassium 3,5-bis(6-(methoxycarbonyl)-1H-benzimidazol-2-yl)benzenesulfonate, 0.2 g of aluminum acetate and 0.25 g of titanium citrate were added to a reaction kettle, and esterification and polycondensation were carried out according to the steps and conditions given in Example 2. The material was then discharged.

The intrinsic viscosity [η] of the copolyester was 0.77 dL/g; the limiting oxygen index was 36.2%; the vertical combustion grade was V-0, and no melt dripping was produced in the test; p-HRR in the cone calorimetry test was 346 kW/$m^2$, and TSR was 744 $m^2/m^2$.

Example 14

498.0 g of terephthalic acid, 220.0 g of ethylene glycol, 109.5 g of dimethyl dioxo-3-phenyl-2,5-dihydro-1H-pyrrol-1-yl)isophthalate, 25.8 g of sodium 2,8-bis((2-hydroxyethoxy)carbonyl)phenoxaphosphinin-10-olate 10-oxide, and 0.25 g of tetraethyl titanate were added to a reaction kettle, and esterification and polycondensation were carried out according to the steps and conditions given in Example 1. The material was then discharged.

The intrinsic viscosity [η] of the copolyester was 0.80 dL/g; the limiting oxygen index was 33.4%; the vertical combustion grade was V-0, and no melt dripping was produced in the test; p-HRR in the cone calorimetry test was 302 kW/$m^2$, and TSR was 855 $m^2/m^2$.

Example 15

498.0 g of terephthalic acid, 220.0 g of ethylene glycol, 88.6 g of 1-(3,5-bis(2-hydroxyethoxy)phenyl)-3-phenyl-1H-pyrrole-2,5-dione, 19.1 g of sodium (3,5-bis(methoxycarbonyl)phenyl)phosphonate, and 0.3 g of potassium titanium oxalate were added to a reaction kettle, and esterification and polycondensation were carried out according to the steps and conditions given in Example 1. The material was then discharged.

The intrinsic viscosity [η] of the copolyester was 0.78 dL/g; the limiting oxygen index was 32.0%; the vertical combustion grade was V-0, and no melt dripping was produced in the test; p-HRR in the cone calorimetry test was 398 kW/$m^2$, and TSR was 926 $m^2$/$m^2$.

Example 16

582.0 g of dimethyl terephthalate, 400.0 g of ethylene glycol, 47.0 g of dimethyl 5-benzamido-1,3-benzenedicarboxylate, 26.8 g of potassium 2,8-bis((2-hydroxyethoxy)carbonyl)phenoxaphosphinin-10-olate 10-oxide, 0.2 g of magnesium acetate and 0.2 g of potassium hexafluorotitanate were added to a reaction kettle, and esterification and polycondensation were carried out according to the steps and conditions given in Example 2. The material was then discharged.

The intrinsic viscosity [η] of the copolyester was 1.2 dL/g; the limiting oxygen index was 28.6%; the vertical combustion grade was V-2; p-HRR in the cone calorimetry test was 465 kW/$m^2$, and TSR was 970 $m^2$/$m^2$.

Example 17

582.0 g of dimethyl terephthalate, 400.0 g of ethylene glycol, 563.4 g of dimethyl 5-benzamido-1,3-benzenedicarboxylate, 17.8 g of potassium (3-(2-hydroxyethoxy)-3-oxopropyl)(phenyl)phosphinate, 40.2 g of sodium 3,5-dicarboxybenzenesulfonate, and 0.24 g of tetraisopropyl titanate were added to a reaction kettle, and esterification and polycondensation were carried out according to the steps and conditions given in Example 2. The material was then discharged.

The intrinsic viscosity [η] of the copolyester was 0.90 dL/g; the limiting oxygen index was 42.8%; the vertical combustion grade was V-0, and no melt dripping was produced in the test; p-HRR in the cone calorimetry test was 195 kW/$m^2$, and TSR was 468 $m^2$/$m^2$.

Example 18

582.0 g of dimethyl terephthalate, 400.0 g of ethylene glycol, 171.0 g of 5-benzamido-1,3-benzenedicarboxylic acid, 52.5 g of potassium (3,5-bis(methoxycarbonyl)phenyl)phosphonate and 0.3 g of antimony glycolate were added to a reaction kettle, and esterification and polycondensation were carried out according to the steps and conditions given in Example 2. The material was then discharged.

The intrinsic viscosity [η] of the copolyester was 1.12 dL/g; the limiting oxygen index was 33.8%; the vertical combustion grade was V-0, and no melt dripping was produced in the test; p-HRR in the cone calorimetry test was 244 kW/$m^2$, and TSR was 787 $m^2$/$m^2$.

Example 19

582.0 g of dimethyl terephthalate, 400.0 g of ethylene glycol, 85.5 g of 5-benzamido-1,3-benzenedicarboxylic acid, 24.1 g of sodium 3,5-dicarboxybenzenesulfonate, and 0.24 g of tetrabutyl titanate were added to a reaction kettle, and esterification and polycondensation were carried out according to the steps and conditions given in Example 2. The material was then discharged.

The intrinsic viscosity [η] of the copolyester was 1.03 dL/g; the limiting oxygen index was 30.5%; the vertical combustion grade was V-0, and no melt dripping was produced in the test; p-HRR in the cone calorimetry test was 290 kW/$m^2$, and TSR was 733 $m^2$/$m^2$.

Example 20

582.0 g of dimethyl terephthalate, 400.0 g of ethylene glycol, 95.1 g of N-(3,5-bis(2-hydroxyethoxy)phenyl)benzamide, 17.6 g of dimethyl 5-(phenylacetylenyl)-1,3-benzenedicarboxylate, 21.0 g of potassium (3,5-bis(methoxycarbonyl)phenyl)phosphonate, 31.7 g of sodium 3,5-bis(6-(methoxycarbonyl)-1H-benzimidazol-2-yl) benzenesulfonate, 0.2 g of nickel acetate and 0.2 g of germanium tetrabutoxide were added to a reaction kettle, and esterification and polycondensation were carried out according to the steps and conditions given in Example 2. The material was then discharged.

The intrinsic viscosity [η] of the copolyester was 0.80 dL/g; the limiting oxygen index was 33.4%; the vertical combustion grade was V-0, and no melt dripping was produced in the test; p-HRR in the cone calorimetry test was 269 kW/$m^2$, and TSR was 676 $m^2$/$m^2$.

Example 21

468.0 g of terephthalic acid, 30.0 g of isophthalic acid, 220.0 g of ethylene glycol, 142.7 g of N-(3,5-bis(2-hydroxyethoxy)phenyl)benzamide, 90.3 g of sodium 2,8-bis(5-(methoxycarbonyl)-1H-benzo[d]imidazol-2-yl)phenoxaphosphinin-10-olate 10-oxide, 0.15 g of magnesium acetate and 0.35 g of aluminum hydroxide were added to a reaction kettle, and esterification and polycondensation were carried out according to the steps and conditions given in Example 1. The material was then discharged.

The intrinsic viscosity [η] of the copolyester was 0.74 dL/g; the limiting oxygen index was 34.0%; the vertical combustion grade was V-0, and no melt dripping was produced in the test; p-HRR in the cone calorimetry test was 241 kW/$m^2$, and TSR was 532 $m^2$/$m^2$.

Example 22

498.0 g of terephthalic acid, 220.0 g of ethylene glycol, 34.4 g of 3,5-dihydroxy-N-phenylbenzamide, 28.0 g of dimethyl 5-(3-cyanophenoxy)isophthalate, 28.6 g of sodium (3,5-bis(methoxycarbonyl)phenyl)phosphonate, 25.2 g of sodium (3-(2-hydroxyethoxy)-3-oxopropyl)(phenyl)phosphinate, and 0.3 g of titanium dioxide were added to a reaction kettle, and esterification and polycondensation were carried out according to the steps and conditions given in Example 1. The material was then discharged.

The intrinsic viscosity [η] of the copolyester was 0.79 dL/g; the limiting oxygen index was 34.0%; the vertical combustion grade was V-0, and no melt dripping was produced in the test; p-HRR in the cone calorimetry test was 235 kW/$m^2$, and TSR was 664 $m^2$/$m^2$.

Example 23

582.0 g of dimethyl terephthalate, 400.0 g of ethylene glycol, 47.6 g of 3,5-bis(2-hydroxyethoxy)-N-phenylbenzamide, 61.4 g of dimethyl 5-((diphenylphosphoryl)amino)isophthalate, 46.8 g of methyl 2-(4-(methoxycarbonyl)phenyl)-1H-benzimidazole-5-carboxylate, 31.8 g of sodium 3,5-dihydroxybenzenesulfonate and 0.3 g of tetrabutyl titanate were added to a reaction kettle, and esterification and polycondensation were carried out according to the steps and conditions given in Example 2. The material was then discharged.

The intrinsic viscosity [η] of the copolyester was 0.90 dL/g; the limiting oxygen index was 36.5%; the vertical combustion grade was V-0, and no melt dripping was produced in the test; p-HRR in the cone calorimetry test was 202 kW/$m^2$, and TSR was 529 $m^2/m^2$.

Example 24

582.0 g of dimethyl terephthalate, 400.0 g of ethylene glycol, 51.3 g of N-(3-cyanophenyl)-3,5-bis(2-hydroxyethoxy)benzamide, 90.3 g of sodium 2,8-bis(5-(methoxycarbonyl)-1H-benzo[d]imidazol-2-yl)phenoxaphosphinin-10-olate 10-oxide, 10.2 g of dimethyl 5-phthalimido-1,3-benzenedicarboxylate, 0.2 g of manganese acetate and 0.2 g of tetraisopropyl titanate were added to a reaction kettle, and esterification and polycondensation were carried out according to the steps and conditions given in Example 2. The material was then discharged.

The intrinsic viscosity [η] of the copolyester was 0.66 dL/g; the limiting oxygen index was 36.0%; the vertical combustion grade was V-0, and no melt dripping was produced in the test; p-HRR in the cone calorimetry test was 250 kW/$m^2$, and TSR was 761 $m^2/m^2$.

Example 25

498.0 g of terephthalic acid, 220.0 g of ethylene glycol, 46.7 g of dimethyl 5-(3-cyanophenoxy)isophthalate, 40.1 g of potassium 2,8-bis((2-hydroxyethoxy)carbonyl)phenoxaphosphinin-10-olate 10-oxide and 0.3 g of titanium citrate were added to a reaction kettle, and esterification and polycondensation were carried out according to the steps and conditions given in Example 1. The material was then discharged.

The intrinsic viscosity [η] of the copolyester was 0.88 dL/g; the limiting oxygen index was 30.0%; the vertical combustion grade was V-2; p-HRR in the cone calorimetry test was 302 kW/$m^2$, and TSR was 893 $m^2/m^2$.

Example 26

498.0 g of terephthalic acid, 220.0 g of ethylene glycol, 93.3 g of dimethyl 5-(4-cyanophenoxy)isophthalate, 122.7 g of dimethyl 5-((diphenylphosphoryl)amino)isophthalate, 190.8 g of sodium (3,5-bis(methoxycarbonyl)phenyl)phosphonate, and 0.3 g of antimony trioxide were added to a reaction kettle, and esterification and polycondensation were carried out according to the steps and conditions given in Example 1. The material was then discharged.

The intrinsic viscosity [η] of the copolyester was 0.75 dL/g; the limiting oxygen index was 39.0%; the vertical combustion grade was V-0, and no melt dripping was produced in the test; p-HRR in the cone calorimetry test was 242 kW/$m^2$, and TSR was 598 $m^2/m^2$.

Example 27

498.0 g of terephthalic acid, 220.0 g of ethylene glycol, 94.5 g of 4-(3,5-bis(2-hydroxyethoxy)phenoxy)benzonitrile, 63.6 g of sodium 3,5-dihydroxybenzenesulfonate and 0.25 g of titanium glycolate were added to a reaction kettle, and esterification and polycondensation were carried out according to the steps and conditions given in Example 1. The material was then discharged.

The intrinsic viscosity [η] of the copolyester was 0.82 dL/g; the limiting oxygen index was 36.8%; the vertical combustion grade was V-0, and no melt dripping was produced in the test; p-HRR in the cone calorimetry test was 252 kW/$m^2$, and TSR was 770 $m^2/m^2$.

Example 28

582.0 g of dimethyl terephthalate, 400.0 g of ethylene glycol, 48.2 g of 5-(benzenesulfonamido)isophthalic acid, 40.1 g of potassium 2,8-bis((2-hydroxyethoxy)carbonyl)phenoxaphosphinin-10-olate 10-oxide, 0.2 g of cobalt acetate and 0.25 g of titanium tartrate were added to a reaction kettle, and esterification and polycondensation were carried out according to the steps and conditions given in Example 2. The material was then discharged.

The intrinsic viscosity [η] of the copolyester was 0.65 dL/g; the limiting oxygen index was 30.2%; the vertical combustion grade was V-2; p-HRR in the cone calorimetry test was 268 kW/$m^2$, and TSR was 690 $m^2/m^2$.

Example 29

498.0 g of terephthalic acid, 220.0 g of ethylene glycol, 159.0 g of N-(3,5-dihydroxyphenyl)benzenesulfonamide, 28.1 g of methyl 2-(4-(methoxycarbonyl)phenyl)-1H-benzimidazole-5-carboxylate, 47.7 g of sodium (3,5-bis(methoxycarbonyl)phenyl)phosphonate, and 0.25 g of isopropyl titanate were added to a reaction kettle, and esterification and polycondensation were carried out according to the steps and conditions given in Example 1. The material was then discharged.

The intrinsic viscosity [η] of the copolyester was 0.82 dL/g; the limiting oxygen index was 38.0%; the vertical combustion grade was V-0, and no melt dripping was produced in the test; p-HRR in the cone calorimetry test was 216 kW/$m^2$, and TSR was 582 $m^2/m^2$.

Example 30

582.0 g of dimethyl terephthalate, 400.0 g of ethylene glycol, 48.2 g of 5-(benzenesulfonamido)isophthalic acid, 80.4 g of sodium 3,5-dicarboxybenzenesulfonate, and 0.3 g of tetrabutyl titanate were added to a reaction kettle, and esterification and polycondensation were carried out according to the steps and conditions given in Example 2. The material was then discharged.

The intrinsic viscosity [η] of the copolyester was 0.76 dL/g; the limiting oxygen index was 32.0%; the vertical combustion grade was V-0, and no melt dripping was produced in the test; p-HRR in the cone calorimetry test was 331 kW/$m^2$, and TSR was 877 $m^2/m^2$.

Example 31

498.0 g of terephthalic acid, 220.0 g of ethylene glycol, 314.1 g of dimethyl 5-(N-phenylsulfamoyl)isophthalate, 95.4 g of sodium (3,5-bis(methoxycarbonyl)phenyl)phosphonate, 0.2 g of antimony acetate and 0.1 g of titanium dioxide were added to a reaction kettle, and esterification and polycondensation were carried out according to the steps and conditions given in Example 1. The material was then discharged.

The intrinsic viscosity [η] of the copolyester was 0.94 dL/g; the limiting oxygen index was 40.5%; the vertical combustion grade was V-0, and no melt dripping was produced in the test; p-HRR in the cone calorimetry test was 177 kW/$m^2$, and TSR was 530 $m^2$/$m^2$.

Example 32

582.0 g of dimethyl terephthalate, 400.0 g of ethylene glycol, 101.7 g of dimethyl 5-phthalimido-1,3-benzenedicarboxylate, 80.4 g of sodium 3,5-dicarboxybenzenesulfonate, 0.2 g of manganese acetate and 0.3 g of potassium titanium oxalate were added to a reaction kettle, and esterification and polycondensation were carried out according to the steps and conditions given in Example 2. The material was then discharged.

The intrinsic viscosity [η] of the copolyester was 0.79 dL/g; the limiting oxygen index was 29.5%; the vertical combustion grade was V-0, and no melt dripping was produced in the test; p-HRR in the cone calorimetry test was 401 kW/$m^2$, and TSR was 933 $m^2$/$m^2$.

Example 33

498.0 g of terephthalic acid, 220.0 g of ethylene glycol, 52.4 g of methyl 4-(N-(4-(methoxycarbonyl)phenyl)sulfamoyl)benzoate, 40.2 g of sodium 3,5-dicarboxybenzenesulfonate, 38.7 g of sodium 2,8-bis((2-hydroxyethoxy)carbonyl)phenoxaphosphinin-10-olate 10-oxide, 28.6 g of sodium (3,5-bis(methoxycarbonyl)phenyl)phosphonate, 0.28 g of titanium dioxide and 0.015 g of zirconium dioxide were added into a reaction kettle, and esterification and polycondensation were carried out according to the steps and conditions given in Example 1. The material was then discharged.

The intrinsic viscosity [η] of the copolyester was 1.10 dL/g; the limiting oxygen index was 29.5%; the vertical combustion grade was V-0, and no melt dripping was produced in the test; p-HRR in the cone calorimetry test was 266 kW/$m^2$, and TSR was 881 $m^2$/$m^2$.

Example 34

498.0 g of terephthalic acid, 220.0 g of ethylene glycol, 168.3 g of methyl 2-cyano ((4-(methoxycarbonyl)phenyl) sulfonamido)benzoate, 81.6 g of potassium 3,5-di(6-(methoxycarbonyl)-1H-benzimidazol-2-yl)benzenesulfonate, 0.2 g of zinc acetate and 0.3 g of antimony glycolate were added to a reaction kettle, and esterification and polycondensation were carried out according to the steps and conditions given in Example 1. The material was then discharged.

The intrinsic viscosity [η] of the copolyester was 0.88 dL/g; the limiting oxygen index was 35.5%; the vertical combustion grade was V-0, and no melt dripping was produced in the test; p-HRR in the cone calorimetry test was 320 kW/$m^2$, and TSR was 686 $m^2$/$m^2$.

Example 35

498.0 g of terephthalic acid, 220.0 g of ethylene glycol, 209.4 g of methyl 4-(N-(4-(methoxycarbonyl)phenyl)sulfamoyl)benzoate, 24.5 g of dimethyl 5-((diphenylphosphoryl) amino)isophthalate, 8.0 g of sodium 3,5-dicarboxybenzenesulfonate, 180.6 g of sodium 2,8-bis(5-(methoxycarbonyl)-1H-benzo[d]imidazol-2-yl)phenoxaphosphinin-10-olate 10-oxide and 0.26 g of tetrabutyl titanate were added to a reaction kettle, and esterification and polycondensation were carried out according to the steps and conditions given in Example 1. The material was then discharged.

The intrinsic viscosity [η] of the copolyester was 1.30 dL/g; the limiting oxygen index was 44.0%; the vertical combustion grade was V-0, and no melt dripping was produced in the test; p-HRR in the cone calorimetry test was 155 kW/$m^2$, and TSR was 443 $m^2$/$m^2$.

Example 36

498.0 g of terephthalic acid, 220.0 g of ethylene glycol, 81.0 g of azobenzene-4,4'-dicarboxylic acid, 64.5 g of sodium 2,8-bis((2-hydroxyethoxy)carbonyl)phenoxaphosphinin-10-olate 10-oxide, and 0.3 g of antimony acetate were added to a reaction kettle, and esterification and polycondensation were carried out according to the steps and conditions given in Example 1. The material was then discharged.

The intrinsic viscosity [η] of the copolyester was 0.70 dL/g; the limiting oxygen index was 30.0%; the vertical combustion grade was V-2; p-HRR in the cone calorimetry test was 402 kW/$m^2$, and TSR was 850 $m^2$/$m^2$.

Example 37

498.0 g of isophthalic acid, 220.0 g of ethylene glycol, 81.0 g of azobenzene-4,4'-dicarboxylic acid, 32.6 g of potassium 3,5-bis(6-(methoxycarbonyl)-1H-benzimidazole yl)benzenesulfonate, 54.2 g of sodium 2,8-bis(5-(methoxycarbonyl)-1H-benzo[d]imidazol yl)phenoxaphosphinin-10-olate 10-oxide, 0.2 g of aluminum acetate, and 0.25 g of titanium glycolate were added to a reaction kettle, and esterification and polycondensation were carried out according to the steps and conditions given in Example 1. The material was then discharged.

The intrinsic viscosity [η] of the copolyester was 0.76 dL/g; the limiting oxygen index was 33.8%; the vertical combustion grade was V-0, and no melt dripping was produced in the test; p-HRR in the cone calorimetry test was 220 kW/$m^2$, and TSR was 617 $m^2$/$m^2$.

Example 38

498.0 g of terephthalic acid, 220.0 g of ethylene glycol, 106.5 g of methyl 2-(4-(methoxycarbonyl)-2-methylphenyl)-1,3-dioxoisoindoline-5-carboxylate, 95.4 g of sodium (3,5-bis(methoxycarbonyl)phenyl)phosphonate and 0.3 g of titanium acetylacetonate were added to a reaction kettle, and esterification and polycondensation were carried out according to the steps and conditions given in Example 1. The material was then discharged.

The intrinsic viscosity [η] of the copolyester was 0.66 dL/g; the limiting oxygen index was 33.8%; the vertical combustion grade was V-0, and no melt dripping was produced in the test; p-HRR in the cone calorimetry test was 322 kW/$m^2$, and TSR was 885 $m^2$/$m^2$.

Example 39

498.0 g of terephthalic acid, 220.0 g of ethylene glycol, 106.5 g of methyl 2-(4-(methoxycarbonyl)-2-methylphenyl)-1,3-dioxoisoindoline-5-carboxylate, 80.4 g of sodium 3,5-dicarboxybenzenesulfonate and 0.28 g of antimony acetate were added to a reaction kettle, and esterification and polycondensation were carried out according to the steps and conditions given in Example 1. The material was then discharged.

The intrinsic viscosity [η] of the copolyester was 0.65 dL/g; the limiting oxygen index was 34.2%; the vertical combustion grade was V-0, and no melt dripping was produced in the test; p-HRR in the cone calorimetry test was 269 kW/$m^2$, and TSR was 764 $m^2/m^2$.

Example 40

498.0 g of terephthalic acid, 270.0 g of 1,3-propanediol, 182.3 g of dimethyl 4,4'-((5-cyano-1,3-phenylene)bis(oxy)) dibenzoate, 24.5 g of dimethyl 5-((diphenylphosphoryl) amino)isophthalate, 47.7 g of sodium (3,5-bis(methoxycarbonyl)phenyl)phosphonate, and 0.2 g of tetraisopropyl titanate were added to a reaction kettle, and esterification and polycondensation were carried out according to the steps and conditions given in Example 1. The material was then discharged.

The intrinsic viscosity [η] of the copolyester was 0.80 dL/g; the limiting oxygen index was 30.0%; the vertical combustion grade was V-0, and no melt dripping was produced in the test; p-HRR in the cone calorimetry test was 517 kW/$m^2$, and TSR was 1295 $m^2/m^2$.

Example 41

498.0 g of isophthalic acid, 270.0 g of 1,3-propanediol, 121.5 g of dimethyl 4,4'-((2-cyano-1,3-phenylene)bis(oxy)) dibenzoate, 95.4 g of sodium 3,5-dihydroxybenzenesulfonate, 0.1 g of antimony acetate and 0.3 g of alumina were added to a reaction kettle, and esterification and polycondensation were carried out according to the steps and conditions given in Example 1. The material was then discharged.

The intrinsic viscosity [η] of the copolyester was 0.76 dL/g; the limiting oxygen index was 32.5%; the vertical combustion grade was V-0, and no melt dripping was produced in the test; p-HRR in the cone calorimetry test was 468 kW/$m^2$, and TSR was 946 $m^2/m^2$.

Example 42

498.0 g of terephthalic acid, 220.0 g of ethylene glycol, 121.5 g of dimethyl 4,4'-((5-cyano-1,3-phenylene)bis(oxy)) dibenzoate, 47.7 g of sodium (3,5-bis(methoxycarbonyl) phenyl)phosphonate, 180.6 g of sodium 2,8-bis(5-(methoxycarbonyl)-1H-benzo[d]imidazol-2-yl)phenoxaphosphinin-10-olate 10-oxide, and 0.3 g of antimony glycolate were added to a reaction kettle, and esterification and polycondensation were carried out according to the steps and conditions given in Example 1. The material was then discharged.

The intrinsic viscosity [η] of the copolyester was 0.77 dL/g; the limiting oxygen index was 50.0%; the vertical combustion grade was V-0, and no melt dripping was produced in the test; p-HRR in the cone calorimetry test was 166 kW/$m^2$, and TSR was 458 $m^2/m^2$.

Example 43

498.0 g of isophthalic acid, 220.0 g of ethylene glycol, 152.1 g of methyl 3-cyano-5-((4-(methoxycarbonyl)phenyl) carbamoyl)benzoate, 47.7 g of sodium (3,5-bis(methoxycarbonyl)phenyl)phosphonate and 0.3 g of potassium hexafluorotitanate were added to a reaction kettle, and esterification and polycondensation were carried out according to the steps and conditions given in Example 1. The material was then discharged.

The intrinsic viscosity [η] of the copolyester was 0.80 dL/g; the limiting oxygen index was 34.6%; the vertical combustion grade was V-0, and no melt dripping was produced in the test; p-HRR in the cone calorimetry test was 270 kW/$m^2$, and TSR was 701 $m^2/m^2$.

Example 44

498.0 g of terephthalic acid, 320.0 g of 1,4-butanediol, 101.4 g of methyl 3-cyano ((4-(methoxycarbonyl)phenyl) carbamoyl)benzoate, 40.2 g of sodium 3,5-dicarboxybenzenesulfonate, 0.2 g of zinc acetate and 0.2 g of tetraphenyl titanate were added to a reaction kettle, and esterification and polycondensation were carried out according to the steps and conditions given in Example 1. The material was then discharged.

The intrinsic viscosity [η] of the copolyester was 0.99 dL/g; the limiting oxygen index was 28.0%; the vertical combustion grade was V-2; p-HRR in the cone calorimetry test was 556 kW/$m^2$, and TSR was 1252 $m^2/m^2$.

Example 45

498.0 g of terephthalic acid, 220.0 g of ethylene glycol, 46.8 g of methyl 2-(4-(methoxycarbonyl)phenyl)-1H-benzimidazole-5-carboxylate, 64.5 g of sodium 2,8-bis((2-hydroxyethoxy)carbonyl)phenoxaphosphinin-10-olate 10-oxide and 0.3 g of tetrabutyl titanate were added to a reaction kettle, and esterification and polycondensation were carried out according to the steps and conditions given in Example 1. The material was then discharged.

The intrinsic viscosity [η] of the copolyester was 1.23 dL/g; the limiting oxygen index was 30.2%; the vertical combustion grade was V-2; p-HRR in the cone calorimetry test was 309 kW/$m^2$, and TSR was 956 $m^2/m^2$.

Example 46

498.0 g of terephthalic acid, 220.0 g of ethylene glycol, 93.6 g of methyl 2-(4-(methoxycarbonyl)phenyl)-1H-benzimidazole-5-carboxylate, 95.4 g of sodium (3,5-bis (methoxycarbonyl)phenyl)phosphonate, 8.9 g of potassium (3-(2-hydroxyethoxy)-3-oxopropyl)(phenyl)phosphinate, and 0.28 g of titanium glycolate were added to a reaction kettle, and esterification and polycondensation were carried out according to the steps and conditions given in Example 1. The material was then discharged.

The intrinsic viscosity [η] of the copolyester was 1.04 dL/g; the limiting oxygen index was 35.2%; the vertical combustion grade was V-0, and no melt dripping was produced in the test; p-HRR in the cone calorimetry test was 253 kW/$m^2$, and TSR was 858 $m^2/m^2$.

Example 47

498.0 g of terephthalic acid, 220.0 g of ethylene glycol, 93.6 g of methyl 2-(4-(methoxycarbonyl)phenyl)-1H-benzimidazole-5-carboxylate, 40.2 g of sodium 3,5-dicarboxybenzenesulfonate, 0.2 g of zinc acetate and 0.3 g of antimony glycolate were added to a reaction kettle, and esterification and polycondensation were carried out according to the steps and conditions given in Example 1. The material was then discharged.

The intrinsic viscosity [η] of the copolyester was 0.89 dL/g; the limiting oxygen index was 34.6%; the vertical combustion grade was V-0, and no melt dripping was produced in the test; p-HRR in the cone calorimetry test was 233 kW/$m^2$, and TSR was 651 $m^2/m^2$.

Example 48

498.0 g of terephthalic acid, 220.0 g of ethylene glycol, 187.2 g of methyl 2-(4-(methoxycarbonyl)phenyl)-1H-benzimidazole-5-carboxylate, 81.6 g of potassium 3,5-bis(6-(methoxycarbonyl)-1H-benzimidazol-2-yl)benzenesulfonate, 0.2 g of manganese acetate and 0.2 g of potassium titanium oxalate were added to a reaction kettle, and esterification and polycondensation were carried out according to the steps and conditions given in Example 1. The material was then discharged.

The intrinsic viscosity [η] of the copolyester was 0.96 dL/g; the limiting oxygen index was 41.0%; the vertical combustion grade was V-0, and no melt dripping was produced in the test; p-HRR in the cone calorimetry test was 173 kW/$m^2$, and TSR was 593 $m^2/m^2$.

Example 49

498.0 g of terephthalic acid, 220.0 g of ethylene glycol, 63.9 g of 2,2'-(1,4-phenylene)bis(methyl 1H-benzimidazole-5-carboxylate), 66.9 g of potassium 2,8-bis((2-hydroxyethoxy)carbonyl)phenoxaphosphinin-10-olate 10-oxide and 0.26 g of tetraisopropyl titanate were added to a reaction kettle, and esterification and polycondensation were carried out according to the steps and conditions given in Example 1. The material was then discharged.

The intrinsic viscosity [η] of the copolyester was 1.69 dL/g; the limiting oxygen index was 34.8%; the vertical combustion grade was V-0, and no melt dripping was produced in the test; p-HRR in the cone calorimetry test was 311 kW/$m^2$, and TSR was 903 $m^2/m^2$.

Example 50

498.0 g of terephthalic acid, 220.0 g of ethylene glycol, 191.7 g of 2,2'-(1,4-phenylene)bis(methyl 1H-benzimidazole-5-carboxylate), 52.5 g of potassium (3,5-bis(methoxycarbonyl)phenyl)phosphonate and 0.3 g of titanium dioxide were added to a reaction kettle, and esterification and polycondensation were carried out according to the steps and conditions given in Example 1. The material was then discharged.

The intrinsic viscosity [η] of the copolyester was 1.04 dL/g; the limiting oxygen index was 40.8%; the vertical combustion grade was V-0, and no melt dripping was produced in the test; p-HRR in the cone calorimetry test was 199 kW/$m^2$, and TSR was 620 $m^2/m^2$.

Example 51

498.0 g of terephthalic acid, 220.0 g of ethylene glycol, 261.9 g of 4-((4-cyanophenyl)acetylenyl)phthalic acid, and 0.3 g of antimony trioxide were added to a reaction kettle, and esterification and polycondensation were carried out according to the steps and conditions given in Example 1. The material was then discharged.

The intrinsic viscosity [η] of the copolyester was 1.22 dL/g; the limiting oxygen index was 34.0%; the vertical combustion grade was V-0, and no melt dripping was produced in the test; p-HRR in the cone calorimetry test was 292 kW/$m^2$, and TSR was 1332 $m^2/m^2$.

Example 52

582.0 g of dimethyl terephthalate, 400.0 g of ethylene glycol, 77.3 g of dimethyl (E)-5-((4-cyanobenzylidene)amino)phenyl-1,3-benzenedicarboxylate, and 0.28 g of antimony acetate were added to a reaction kettle, and esterification and polycondensation were carried out according to the steps and conditions given in Example 2. The material was then discharged.

The intrinsic viscosity [η] of the copolyester was 0.72 dL/g; the limiting oxygen index was 30.8%; the vertical combustion grade was V-0, and no melt dripping was produced in the test; p-HRR in the cone calorimetry test was 369 kW/$m^2$, and TSR was 946 $m^2/m^2$.

Example 53

582.0 g of dimethyl terephthalate, 400.0 g of ethylene glycol, 102.2 g of 2,2'-(1,4-phenylene)bis(methyl 1H-benzimidazole-5-carboxylate), 59.9 g of 5-benzamido-1,3-benzenedicarboxylic acid, and 0.3 g of tetrabutyl titanate were added to a reaction kettle, and esterification and polycondensation were carried out according to the steps and conditions given in Example 2. The material was then discharged.

The intrinsic viscosity [η] of the copolyester was 0.91 dL/g; the limiting oxygen index was 32.0%; the vertical combustion grade was V-0, and no melt dripping was produced in the test; p-HRR in the cone calorimetry test was 321 kW/$m^2$, and TSR was 1257 $m^2/m^2$.

Example 54

582.0 g of dimethyl terephthalate, 400.0 g of ethylene glycol, 76.6 g of dimethyl 5-(3-cyanophenoxy)isophthalate, 65.9 g of dimethyl 5-(1,3-dioxo-5-(phenylethynyl)isoindolin-2-yl)isophthalate, 0.2 g of manganese acetate and 0.2 g of titanium glycolate were added to a reaction kettle, and esterification and polycondensation were carried out according to the steps and conditions given in Example 2. The material was then discharged.

The intrinsic viscosity [$_9$] of the copolyester was 0.68 dL/g; the limiting oxygen index was 31.0%; the vertical combustion grade was V-0, and no melt dripping was produced in the test; p-HRR in the cone calorimetry test was 312 kW/$m^2$, and TSR was 1076 $m^2/m^2$.

Example 55

582.0 g of dimethyl terephthalate, 400.0 g of ethylene glycol, 44.1 g of dimethyl 5-(phenylacetylenyl)-1,3-benzenedicarboxylate, 44.6 g of dimethyl (E)-5-(benzylideneamino)isophthalate, 54.8 g of dimethyl 5-(2,5-dioxo-3-phenyl-2,5-dihydro-1H-pyrrol-1-yl)isophthalate, 0.2 g of magnesium acetate, 0.27 g of titanium dioxide and 0.03 g of silicon dioxide were added to a reaction kettle, and esterification and polycondensation were carried out according to the steps and conditions given in Example 2. The material was then discharged.

The intrinsic viscosity [η] of the copolyester was 0.76 dL/g; the limiting oxygen index was 31.8%; the vertical combustion grade was V-0, and no melt dripping was produced in the test; p-HRR in the cone calorimetry test was 284 kW/$m^2$, and TSR was 1105 $m^2/m^2$.

Comparative Example 1

498.0 g of terephthalic acid, 220.0 g of ethylene glycol, 0.2 g of zinc acetate and 0.3 g of antimony trioxide were added to a reaction kettle, and esterification and polycondensation were carried out according to the steps and conditions given in Example 1. The material was then discharged. The intrinsic viscosity [η] of the PET polyester was 0.80 dL/g; the limiting oxygen index was 22.0%; the vertical combustion grade was no grade, and a large number of melt dripping were produced in the test; p-HRR in the cone calorimetry test was 735 $kW/m^2$; and TSR was 1756 $m^2/m^2$.

Comparative Example 2

498.0 g of terephthalic acid, 220.0 g of ethylene glycol, 159.6 g of 4-(phenylacetylenyl)1,2-benzenedicarboxylic acid, 0.2 g of zinc acetate and 0.3 g of antimony trioxide were added to a reaction kettle, and esterification and polycondensation were carried out according to the steps and conditions given in Example 1. The material was then discharged. The intrinsic viscosity [η] of the copolyester was 0.95 dL/g; the limiting oxygen index was 28.0%; the vertical combustion grade was V-2, and a small amount of melt dripping were produced in the test; p-HRR in the cone calorimetry test was 471 $kW/m^2$; and TSR was 1939 $m^2/m^2$.

Comparative Example 3

498.0 g of terephthalic acid, 220.0 g of ethylene glycol, 38.7 g of sodium 2,8-bis((2-hydroxyethoxy)carbonyl)phenoxaphosphinin-10-olate 10-oxide, 0.2 g of zinc acetate and 0.3 g of antimony trioxide were added to a reaction kettle, and esterification and polycondensation were carried out according to the steps and conditions given in Example 1. The material was then discharged. The intrinsic viscosity [η] of the copolyester was 0.84 dL/g; the limiting oxygen index was 25.5%; the vertical combustion grade was no grade, and many melt dripping were produced in the test; p-HRR in the cone calorimetry test was 392 $kW/m^2$; and TSR was 1077 $m^2/m^2$.

Comparative Example 4 (Compared with Example 2)

582.0 g of dimethyl terephthalate, 400.0 g of ethylene glycol, 25.2 g of sodium (3-(2-hydroxyethoxy)-3-oxopropyl)(phenyl)phosphinate, 0.2 g of manganese acetate and 0.25 g of germanium dioxide were added to a reaction kettle, and esterification and polycondensation were carried out according to the steps and conditions given in Example 2. The material was then discharged. The intrinsic viscosity [η] of the copolyester was 0.60 dL/g; the limiting oxygen index was 24.0%; the vertical combustion grade was no grade, and many melt dripping were produced in the test; the peak heat release rate p-HRR in the cone calorimetry test was 655 $kW/m^2$ and the total smoke release TSR was 1634 $m^2/m^2$.

Comparative Example 5 (Compared with Examples 3 and 13)

388.0 g of dimethyl terephthalate, 194 g of dimethyl isophthalate, 400.0 g of ethylene glycol, and 0.28 g of isopropyl titanate were added to a reaction kettle, and esterification and polycondensation were carried out according to the steps and conditions given in Example 2. The material was then discharged. The intrinsic viscosity [η] of the copolyester was 0.64 dL/g; the limiting oxygen index was 21.0%; the vertical combustion grade was no grade, and a large number of melt dripping were produced in the test; p-HRR in the cone calorimetry test was 821 $kW/m^2$, and TSR was 1850 $m^2/m^2$.

Comparative Example 6 (Compared with Example 3)

388.0 g of dimethyl terephthalate, 194 g of dimethyl isophthalate, 400.0 g of ethylene glycol, 79.8 g 4-(phenylacetylenyl)1,2-benzenedicarboxylic acid, and 0.28 g of isopropyl titanate were added to a reaction kettle, and esterification and polycondensation were carried out according to the steps and conditions given in Example 2. The material was then discharged. The intrinsic viscosity [η] of the copolyester was 0.80 dL/g; the limiting oxygen index was 25.0%; the vertical combustion grade was V-2, and melt dripping were produced in the test; p-HRR in the cone calorimetry test was 605 $kW/m^2$, and TSR was 1764 $m^2/m^2$.

Comparative Example 7 (Compared with Example 3)

388.0 g of dimethyl terephthalate, 194 g of dimethyl isophthalate, 400.0 g of ethylene glycol, 52.5 g of potassium (3,5-bis(methoxycarbonyl)phenyl)phosphonate, 40.2 g of sodium 3,5-dicarboxybenzenesulfonate and 0.28 g of isopropyl titanate were added to a reaction kettle, and esterification and polycondensation were carried out according to the steps and conditions given in Example 2. The material was then discharged. The intrinsic viscosity [η] of the copolyester was 0.82 dL/g; the limiting oxygen index was 27.5%; the vertical combustion grade was V-2, and melt dripping were produced in the test; p-HRR in the cone calorimetry test was 484 $kW/m^2$, and TSR was 1062 $m^2/m^2$.

Comparative Example 8 (Compared with Examples 8 and 9)

498.0 g of terephthalic acid, 220.0 g of ethylene glycol, 131.7 g of dimethyl 5-(1,3-dioxo-5-(phenylethynyl)isoindolin-2-yl)isophthalate, 0.2 g of magnesium acetate and 0.2 g of titanium dioxide were added to a reaction kettle, and esterification and polycondensation were carried out according to the steps and conditions given in Example 1. The material was then discharged. The intrinsic viscosity [η] of the copolyester was 0.80 dL/g; the limiting oxygen index was 30.0%; the vertical combustion grade was V-2, and melt dripping were produced in the test; p-HRR in the cone calorimetry test was 436 $kW/m^2$, and TSR was 1240 $m^2/m^2$.

Comparative Example 9 (Compared with Examples 8 and 22)

498.0 g of terephthalic acid, 220.0 g of ethylene glycol, 28.6 g of sodium (3,5-bis(methoxycarbonyl)phenyl)phosphonate, 25.5 g of sodium (3-(2-hydroxyethoxy)-3-oxopropyl)(phenyl)phosphinate, 0.2 g of magnesium acetate and 0.2 g of titanium dioxide were added to a reaction kettle, and esterification and polycondensation were carried out according to the steps and conditions given in Example 1. The material was then discharged. The intrinsic viscosity [η] of the copolyester was 0.74 dL/g; the limiting oxygen index was 26.0%; the vertical combustion grade was V-2, and melt dripping were produced in the test; p-HRR in the cone calorimetry test was 488 $kW/m^2$, and TSR was 1055 $m^2/m^2$.

Comparative Example 10 (Compared with Example 9)

498.0 g of terephthalic acid, 220.0 g of ethylene glycol, 42.6 g of potassium 3,5-dicarboxybenzenesulfonate, and 0.3 g of antimony glycolate were added to a reaction kettle, and esterification and polycondensation were carried out according to the steps and conditions given in Example 1. The material was then discharged. The intrinsic viscosity [η] of the copolyester was 0.68 dL/g; the limiting oxygen index was 25.0%; the vertical combustion grade was V-2, and many melt dripping were produced in the test; p-HRR in the cone calorimetry test was 560 kW/$m^2$ and the TSR was 1325 $m^2/m^2$.

Comparative Example 11 (Compared with Example 13)

388.0 g of dimethyl terephthalate, 194.0 g of dimethyl isophthalate, 400.0 g of ethylene glycol, 178.2 g of dimethyl (E)-5-(benzylideneamino)phenyl-1,3-benzenedicarboxylate, 0.2 g of aluminum acetate and 0.25 g of titanium citrate were added to a reaction kettle, and esterification and polycondensation were carried out according to the steps and conditions given in Example 2. The material was then discharged. The intrinsic viscosity [η] of the copolyester was 0.74 dL/g; the limiting oxygen index was 31.0%; the vertical combustion grade was V-0, and no melt dripping was produced in the test; p-HRR in the cone calorimetry test was 458 kW/$m^2$, and TSR was 1221 $m^2/m^2$.

Comparative Example 12 (Compared with Examples 13, 34, 48)

388.0 g of dimethyl terephthalate, 194.0 g of dimethyl isophthalate, 400.0 g of ethylene glycol, 81.6 g of potassium 3,5-bis(6-(methoxycarbonyl)-1H-benzimidazole yl)benzenesulfonate, 0.2 g of aluminum acetate and 0.25 g of titanium citrate were added to a reaction kettle, and esterification and polycondensation were carried out according to the steps and conditions given in Example 2. The material was then discharged. The intrinsic viscosity of the copolyester was 0.78 dL/g; the limiting oxygen index was 28.0%; the vertical combustion grade was V-2, and melt dripping were produced in the test; p-HRR in the cone calorimetry test was 505 kW/$m^2$, and TSR was 1174 $m^2/m^2$.

Comparative Example 13 (Compared with Example 15)

498.0 g of terephthalic acid, 220.0 g of ethylene glycol, 88.6 g of 1-(3,5-bis(2-hydroxyethoxy)phenyl)-3-phenyl-1H-pyrrole-2,5-dione and 0.3 g of potassium titanium oxalate were added to a reaction kettle, and esterification and polycondensation were carried out according to the steps and conditions given in Example 1. The material was then discharged. The intrinsic viscosity [η] of this copolyester was 0.70 dL/g; The limiting oxygen index was 28.5%; the vertical combustion grade was V-2, and melt dripping were produced in the test; p-HRR in the cone calorimetry test was 480 kW/$m^2$, and the TSR was 1335 $m^2/m^2$.

Comparative Example 14 (Compared with Example 15)

498.0 g of terephthalic acid, 220.0 g of ethylene glycol, 19.1 g of sodium (3,5-bis(methoxycarbonyl)phenyl)phosphonate, and 0.3 g of potassium titanium oxalate were added to a reaction kettle, and esterification and polycondensation were carried out according to the steps and conditions given in Example 1. The material was then discharged. The intrinsic viscosity [η] of the copolyester was 0.75 dL/g; the limiting oxygen index was 24.0%; the vertical combustion grade was no grade, and a large number of melt dripping were produced in the test; p-HRR in the cone calorimetry test was 652 kW/$m^2$, and TSR was 1486 $m^2/m^2$.

Comparative Example 15 (Compared with Example 18)

582.0 g of dimethyl terephthalate, 400.0 g of ethylene glycol, 171.0 g of 5-benzamido-1,3-benzenedicarboxylic acid, and 0.3 g of antimony glycolate were added to a reaction kettle, and esterification and polycondensation were carried out according to the steps and conditions given in Example 2. The material was then discharged. The intrinsic viscosity [η] of the copolyester was 0.95 dL/g; the limiting oxygen index was 31.0%; the vertical combustion grade was V-0, and no melt dripping was produced in the test; p-HRR in the cone calorimetry test was 350 kW/$m^2$, and TSR was 986 $m^2/m^2$.

Comparative Example 16 (Compared with Examples 18 and 50)

582.0 g of dimethyl terephthalate, 400.0 g of ethylene glycol, 52.5 g of potassium (3,5-bis(methoxycarbonyl)phenyl)phosphonate, and 0.3 g of antimony glycolate were added to a reaction kettle, and esterification and polycondensation were carried out according to the steps and conditions given in Example 2. The material was then discharged. The intrinsic viscosity [η] of the copolyester was 0.86 dL/g; the limiting oxygen index was 26.0%; the vertical combustion grade was V-2, and many melt dripping were produced in the test; p-HRR in the cone calorimetry test was 587 kW/$m^2$ and the TSR was 1256 $m^2/m^2$.

Comparative Example 17 (Compared with Example 19)

582.0 g of dimethyl terephthalate, 400.0 g of ethylene glycol, 85.5 g of 5-benzamido-1,3-benzenedicarboxylic acid, and 0.24 g of tetrabutyl titanate were added to a reaction kettle, and esterification and polycondensation were carried out according to the steps and conditions given in Example 2. The material was then discharged. The intrinsic viscosity [η] of the copolyester was 0.85 dL/g; the limiting oxygen index was 28.0%; the vertical combustion grade was V-2, and melt dripping were produced in the test; p-HRR in the cone calorimetry test was 456 kW/$m^2$, and TSR was 1258 $m^2/m^2$.

Comparative Example 18 (Compared with Example 19)

582.0 g of dimethyl terephthalate, 400.0 g of ethylene glycol, 24.1 g of sodium 3,5-dicarboxybenzenesulfonate, and 0.24 g of tetrabutyl titanate were added to a reaction kettle, and esterification and polycondensation were carried out according to the steps and conditions given in Example 2. The material was then discharged. The intrinsic viscosity [η] of the copolyester was 0.88 dL/g; the limiting oxygen index was 24.0%; the vertical combustion grade was no grade, and many melt dripping were produced in the test; p-HRR in the cone calorimetry test was 605 kW/$m^2$, and TSR was 1359 $m^2/m^2$.

Comparative Example 19 (Compared with Example 19)

582.0 g of dimethyl terephthalate, 400.0 g of ethylene glycol, 120.6 g of sodium 3,5-dicarboxybenzenesulfonate, and 0.24 g of tetrabutyl titanate were added to a reaction kettle, and esterification and polycondensation were carried out according to the steps and conditions given in Example 2. The material was then discharged. The intrinsic viscosity [η] of the copolyester was 0.76 dL/g; the limiting oxygen index was 27.0%; the vertical combustion grade was V-2, and melt dripping were produced in the test; p-HRR in the cone calorimetry test was 476 $kW/m^2$, and TSR was 1095 $m^2/m^2$.

Comparative Example 20 (Compared with Examples 19, 20, 21)

468.0 g of terephthalic acid, 30.0 g of isophthalic acid, 220.0 g of ethylene glycol, 142.7 g of N-(3,5-bis(2-hydroxyethoxy)phenyl)benzamide, 0.15 g of magnesium acetate and 0.35 g of aluminum hydroxide were added to a reaction kettle, and esterification and polycondensation were carried out according to the steps and conditions given in Example 1. The material was then discharged. The intrinsic viscosity [η] of the copolyester was 0.92 dL/g; the limiting oxygen index was 29.5%; the vertical combustion grade was V-2, and melt dripping were produced in the test; p-HRR in the cone calorimetry test was 388 $kW/m^2$, and TSR was 1065 $m^2/m^2$.

Comparative Example 21 (Compared with Examples 21 and 24)

468.0 g of terephthalic acid, 30.0 g of isophthalic acid, 220.0 g of ethylene glycol, 90.3 g of sodium 2,8-bis(5-(methoxycarbonyl)-1H-benzo[d]imidazol-2-yl)phenoxaphosphinin-10-olate 10-oxide, 0.15 g of magnesium acetate and 0.35 g of aluminum hydroxide were added to a reaction kettle, and esterification and polycondensation were carried out according to the steps and conditions given in Example 1. The material was then discharged. The intrinsic viscosity [η] of the copolyester was 0.70 dL/g; the limiting oxygen index was 28.0%; the vertical combustion grade was V-2, and melt dripping were produced in the test; p-HRR in the cone calorimetry test was 480 $kW/m^2$, and TSR was 1153 $m^2/m^2$.

Comparative Example 22 (Compared with Example 22)

498.0 g of terephthalic acid, 220.0 g of ethylene glycol, 34.4 g of 3,5-dihydroxy-N-phenylbenzamide, 28.0 g of dimethyl 5-(3-cyanophenoxy)isophthalate and 0.3 g of titanium dioxide were added to a reaction kettle, and esterification and polycondensation were carried out according to the steps and conditions given in Example 1. The material was then discharged. The intrinsic viscosity [η] of the copolyester was 0.72 dL/g; the limiting oxygen index was 28.0%; the vertical combustion grade was V-2, and melt dripping were produced in the test; p-HRR in the cone calorimetry test was 536 $kW/m^2$, and TSR was 1159 $m^2/m^2$.

Comparative Example 23 (Compared with Example 24)

582.0 g of dimethyl terephthalate, 400.0 g of ethylene glycol, 51.3 g of N-(3-cyanophenyl)-3,5-bis(2-hydroxyethoxy)benzamide, 10.2 g of dimethyl 5-phthalimido-1,3-benzenedicarboxylate, 0.2 g of manganese acetate and 0.2 g of tetraisopropyl titanate were added to a reaction kettle, and esterification and polycondensation were carried out according to the steps and conditions given in Example 2. The material was then discharged. The intrinsic viscosity [η] of the copolyester was 0.70 dL/g; the limiting oxygen index was 26.0%; the vertical combustion grade was V-2, and melt dripping were produced in the test; p-HRR in the cone calorimetry test was 492 $kW/m^2$, and TSR was 1204 $m^2/m^2$.

Comparative Example 24 (Compared with Examples 28 and 30)

582.0 g of dimethyl terephthalate, 400.0 g of ethylene glycol, 48.2 g of 5-(benzenesulfonamido)isophthalic acid, and 0.3 g of tetrabutyl titanate were added to a reaction kettle, and esterification and polycondensation were carried out according to the steps and conditions given in Example 2. The material was then discharged. The intrinsic viscosity [η] of the copolyester was 0.80 dL/g; the limiting oxygen index was 27.5%; the vertical combustion grade was V-2, and melt dripping were produced in the test; p-HRR in the cone calorimetry test was 510 $kW/m^2$, and TSR was 1126 $m^2/m^2$.

Comparative Example 25 (Compared with Example 28)

582.0 g of dimethyl terephthalate, 400.0 g of ethylene glycol, 40.1 g of potassium 2,8-bis((2-hydroxyethoxy)carbonyl)phenoxaphosphinin-10-olate 10-oxide, 0.2 g of cobalt acetate, and 0.25 g of titanium tartrate were added to a reaction kettle, and esterification and polycondensation were carried out according to the steps and conditions given in Example 2. The material was then discharged. The intrinsic viscosity [η] of the copolyester was 0.63 dL/g; the limiting oxygen index was 24.0%; the vertical combustion grade was no grade, and a large number of melt dripping were produced in the test; p-HRR in the cone calorimetry test was 651 $kW/m^2$, and TSR was 1247 $m^2/m^2$.

Comparative Example 26 (Compared with Examples 30, 32, 39)

582.0 g of dimethyl terephthalate, 400.0 g of ethylene glycol, 80.4 g of sodium 3,5-dicarboxybenzenesulfonate, 0.3 g of tetrabutyl titanate were added to a reaction kettle, and esterification and polycondensation were carried out according to the steps and conditions given in Example 2. The material was then discharged. The intrinsic viscosity [η] of the copolyester was 0.85 dL/g; the limiting oxygen index was 26.0%; the vertical combustion grade was V-2, and melt dripping were produced in the test; p-HRR in the cone calorimetry test was 525 $kW/m^2$, and TSR was 1237 $m^2/m^2$.

Comparative Example 27 (Compared with Example 31)

498.0 g of terephthalic acid, 220.0 g of ethylene glycol, 314.1 g of dimethyl 5-(N-phenylsulfamoyl)isophthalate, 0.2 g of antimony acetate and 0.1 g of titanium dioxide were added to a reaction kettle, and esterification and polycondensation were carried out according to the steps and conditions given in Example 1. The material was then discharged. The intrinsic viscosity [η] of the copolyester was 0.76 dL/g; the limiting oxygen index was 34.0%; the vertical combustion grade was V-0, and no melt dripping was produced in the test; p-HRR in the cone calorimetry test was 805 kW/$m^2$, and TSR was 956 $m^2/m^2$.

Comparative Example 28 (Compared with Examples 31 and 38)

498.0 g of terephthalic acid, 220.0 g of ethylene glycol, 95.4 g of sodium (3,5-bis(methoxycarbonyl)phenyl)phosphonate, 0.2 g of antimony acetate and 0.1 g of titanium dioxide were added to a reaction kettle, and esterification and polycondensation were carried out according to the steps and conditions given in Example 1. The material was then discharged. The intrinsic viscosity [η] of the copolyester was 0.77 dL/g; the limiting oxygen index was 27.0%; the vertical combustion grade was V-2, and melt dripping were produced in the test; p-HRR in the cone calorimetry test was 963 kW/$m^2$, and TSR was 1022 $m^2/m^2$.

Comparative Example 29 (Compared with Example 32)

582.0 g of dimethyl terephthalate, 400.0 g of ethylene glycol, 101.7 g of dimethyl 5-phthalimido-1,3-benzenedicarboxylate, 0.2 g of manganese acetate and 0.3 g of potassium titanium oxalate were added to a reaction kettle, and esterification and polycondensation were carried out according to the steps and conditions given in Example 2. The material was then discharged. The intrinsic viscosity [η] of the copolyester was 0.70 dL/g; the limiting oxygen index was 25.0%; the vertical combustion grade was V-2, and melt dripping were produced in the test; p-HRR in the cone calorimetry test was 956 kW/$m^2$, and TSR was 1350 $m^2/m^2$.

Comparative Example 30 (Compared with Example 34)

498.0 g of terephthalic acid, 220.0 g of ethylene glycol, 168.3 g of methyl 2-cyano-4-((4-(methoxycarbonyl)phenyl) sulfonamido)benzoate, 0.2 g of zinc acetate and 0.3 g of antimony glycolate were added to a reaction kettle, and esterification and polycondensation were carried out according to the steps and conditions given in Example 1. The material was then discharged. The intrinsic viscosity [η] of the copolyester was 0.74 dL/g; the limiting oxygen index was 30.0%; the vertical combustion grade was V-2, and melt dripping were produced in the test; p-HRR in the cone calorimetry test was 743 kW/$m^2$, and TSR was 967 $m^2/m^2$.

Comparative Example 31 (Compared with Examples 38 and 39)

498.0 g of terephthalic acid, 220.0 g of ethylene glycol, 106.5 g of methyl 2-(4-(methoxycarbonyl)-2-methylphenyl)-1,3-dioxoisoindoline-5-carboxylate, and 0.3 g of titanium acetylacetonate were added to a reaction kettle, and esterification and polycondensation were carried out according to the steps and conditions given in Example 1. The material was then discharged. The intrinsic viscosity [η] of the copolyester was 0.65 dL/g; the limiting oxygen index was 27.0%; the vertical combustion grade was V-2, and melt dripping were produced in the test; p-HRR in the cone calorimetry test was 565 kW/$m^2$, and TSR was 1239 $m^2/m^2$.

Comparative Example 32 (Compared with Example 41)

498.0 g of isophthalic acid, 270.0 g of 1,3-propanediol, 0.1 g of antimony acetate and 0.3 g of alumina were added to a reaction kettle, and esterification and polycondensation were carried out according to the steps and conditions given in Example 1. The material was then discharged. The intrinsic viscosity [η] of the copolyester was 0.80 dL/g; the limiting oxygen index was 19.0%; the vertical combustion grade was no grade, and a large number of melt dripping were produced in the test; p-HRR in the cone calorimetry test was 1093 kW/$m^2$, and TSR was 2056 $m^2/m^2$.

Comparative Example 33 (Compared with Example 41)

498.0 g of isophthalic acid, 270.0 g of 1,3-propanediol, 121.5 g of dimethyl 4,4'-((2-cyano-1,3-phenylene)bis(oxy)) dibenzoate, 0.1 g of antimony acetate and 0.3 g of alumina were added to a reaction kettle, and esterification and polycondensation were carried out according to the steps and conditions given in Example 1. The material was then discharged. The intrinsic viscosity [η] of the copolyester was 0.70 dL/g; the limiting oxygen index was 28.5%; the vertical combustion grade was V-2, and melt dripping were produced in the test; p-HRR in the cone calorimetry test was 650 kW/$m^2$, and TSR was 1422 $m^2/m^2$.

Comparative Example 34 (Compared with Example 41)

498.0 g of isophthalic acid, 270.0 g of 1,3-propanediol, 95.4 g of sodium 3,5-dihydroxybenzenesulfonate, 0.1 g of antimony acetate and 0.3 g of alumina were added to a reaction kettle, and esterification and polycondensation were carried out according to the steps and conditions given in Example 1. The material was then discharged. The intrinsic viscosity [η] of the copolyester was 0.79 dL/g; the limiting oxygen index was 26.0%; the vertical combustion grade was V-2, and melt dripping were produced in the test; p-HRR in the cone calorimetry test was 741 kW/$m^2$, and TSR was 1255 $m^2/m^2$.

Comparative Example 35 (Compared with Examples 46 and 47)

498.0 g of terephthalic acid, 220.0 g of ethylene glycol, 93.6 g of methyl 2-(4-(methoxycarbonyl)phenyl)-1H-benzimidazole-5-carboxylate, and 0.28 g of titanium glycolate were added to a reaction kettle, and esterification and polycondensation were carried out according to the steps and conditions given in Example 1. The material was then discharged. The intrinsic viscosity [η] of the copolyester was 0.84 dL/g; the limiting oxygen index was 28.0%; the vertical combustion grade was V-2, and melt dripping were produced in the test; p-HRR in the cone calorimetry test was 502 kW/$m^2$, and TSR was 1231 $m^2/m^2$.

Comparative Example 36 (Compared with Example 46)

498.0 g of terephthalic acid, 220.0 g of ethylene glycol, 95.4 g of sodium (3,5-bis(methoxycarbonyl)phenyl)phosphonate, 8.9 g of potassium (3-(2-hydroxyethoxy)-3-oxopropyl)(phenyl)phosphinate and 0.28 g of titanium glycolate were added to a reaction kettle, and esterification and polycondensation were carried out according to the steps and conditions given in Example 1. The material was then discharged. The intrinsic viscosity [η] of the copolyester was 0.75 dL/g; the limiting oxygen index was 26.5%; the vertical combustion grade was V-2, and melt dripping were produced in the test; p-HRR in the cone calorimetry test was 540 $kW/m^2$, and TSR was 1147 $m^2/m^2$.

Comparative Example 37 (Compared with Example 47)

498.0 g of terephthalic acid, 220.0 g of ethylene glycol, 40.2 g of sodium 3,5-dicarboxybenzenesulfonate, 0.2 g of zinc acetate and 0.3 g of antimony glycolate were added to a reaction kettle, and esterification and polycondensation were carried out according to the steps and conditions given in Example 1. The material was then discharged. The intrinsic viscosity [η] of the copolyester was 0.80 dL/g; the limiting oxygen index was 25.0%; the vertical combustion grade was V-2, and melt dripping were produced in the test; p-HRR in the cone calorimetry test was 608 $kW/m^2$, and TSR was 1423 $m^2/m^2$.

Comparative Example 38 (Compared with Example 48)

498.0 g of terephthalic acid, 220.0 g of ethylene glycol, 187.2 g of methyl 2-(4-(methoxycarbonyl)phenyl)-1H-benzimidazole-5-carboxylate, 0.2 g of manganese acetate and 0.2 g of potassium titanium oxalate were added to a reaction kettle, and esterification and polycondensation were carried out according to the steps and conditions given in Example 1. The material was then discharged. The intrinsic viscosity [η] of the copolyester was 0.81 dL/g; the limiting oxygen index was 33.0%; the vertical combustion grade was V-0, and no melt dripping was produced in the test; p-HRR in the cone calorimetry test was 386 $kW/m^2$, and TSR was 977 $m^2/m^2$.

Comparative Example 39 (Compared with Example 49)

498.0 g of terephthalic acid, 220.0 g of ethylene glycol, 63.9 g of 2,2'-(1,4-phenylene)bis(methyl 1H-benzimidazole-5-carboxylate), and 0.26 g of tetraisopropyl titanate were added to a reaction kettle, and esterification and polycondensation were carried out according to the steps and conditions given in Example 1. The material was then discharged. The intrinsic viscosity [η] of the copolyester was 0.84 dL/g; the limiting oxygen index was 27.0%; the vertical combustion grade was V-2, and melt dripping were produced in the test; p-HRR in the cone calorimetry test was 598 $kW/m^2$, and TSR was 1425 $m^2/m^2$.

Comparative Example 40 (Compared with Example 49)

498.0 g of terephthalic acid, 220.0 g of ethylene glycol, 66.9 g of potassium 2,8-bis((2-hydroxyethoxy)carbonyl) phenoxaphosphinin-10-olate 10-oxide, and 0.26 g of tetraisopropyl titanate were added to a reaction kettle, and esterification and polycondensation were carried out according to the steps and conditions given in Example 1. The material was then discharged.

The intrinsic viscosity [η] of the copolyester was 0.70 dL/g; the limiting oxygen index was 25.0%; the vertical combustion grade was V-2, and melt dripping were produced in the test; p-HRR in the cone calorimetry test was 624 $kW/m^2$, and TSR was 1244 $m^2/m^2$.

FIGS. 1-5 further illustrate Example 4 of the present disclosure.

FIG. 1 is a dynamic rheological diagram of the copolyester prepared in Example 4 of the present disclosure and pure PET prepared in Comparative Example 1 at variable temperature. The higher the complex viscosity of thermoplastic polymers at high temperature, the higher the melt viscosity and melt strength during combustion, and the stronger the corresponding anti-dripping ability. The complex viscosity of the pure PET gradually decreased with the increase of temperature, showing shear-thinning rheological behavior. The complex viscosity of the copolyester showed a "U"-shaped change curve that first decreased and then increased with the increase of temperature, indicating that the copolyester underwent self-crosslinking reaction at high temperature. The self-crosslinking reaction can effectively increase the melt viscosity and strength of the copolyester when it is burned, thereby playing anti-dripping role.

Figure 2:
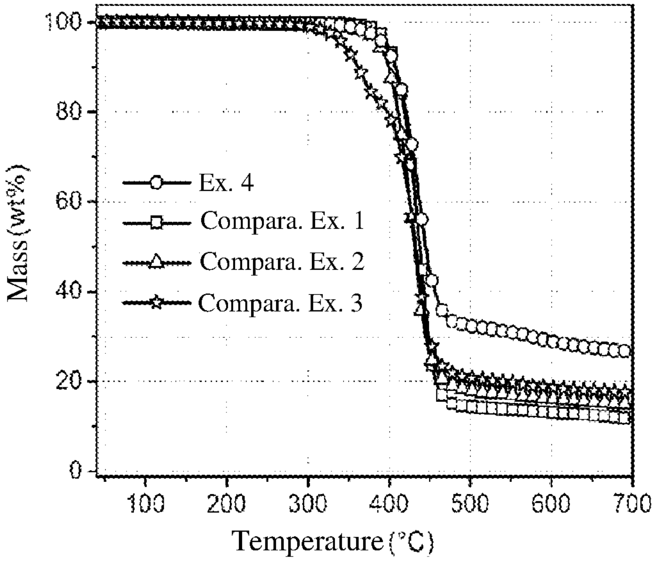
FIG. 2 shows a thermogravimetric curve of copolyester containing phenylacetylene self-crosslinking functional group and sodium phosphinate ionic group prepared in Example 4, pure PET prepared in Comparative Example 1, copolyester containing only phenylacetylene self-crosslinking functional group prepared in Comparative Example 2, and copolyester containing only sodium phosphinate ionic group prepared in Comparative Example 3.

FIG. 2 shows a thermogravimetric curve of copolyester containing phenylacetylene self-crosslinking functional group and sodium phosphinate ionic group prepared in Example 4 of the present disclosure, pure PET prepared in Comparative Example 1, copolyester containing only phenylacetylene self-crosslinking functional group prepared in Comparative Example 2, and copolyester containing only sodium phosphinate ionic group prepared in Comparative Example 3. As can be seen from FIG. 2, in a nitrogen atmosphere, the copolyester of Example 4 of the present disclosure not only maintained good thermal stability, but also had a much higher char residue (26.6 wt %) at high temperature (700° C.) compared with those of pure PET (11.8 wt %), Comparative Example 2 (14.9 wt %) and Comparative Example 3 (17.5 wt %). Although the char residues of Example 4, Comparative Example 2 and Comparative Example 3 were increased by 14.8 wt %, 3.1 wt % and 5.7 wt % respectively compared with that of pure PET, the increased char residue of Example 4 was greater than the sum of the increased char residue of Comparative Example 2 and the increased char residue of Comparative Example 3, indicating that the char-forming ability of the copolyester prepared by the present disclosure is further increased due to the synergistic flame-retardant effect of the high-temperature self-crosslinking functional group and the ionic group.

Figure 3:
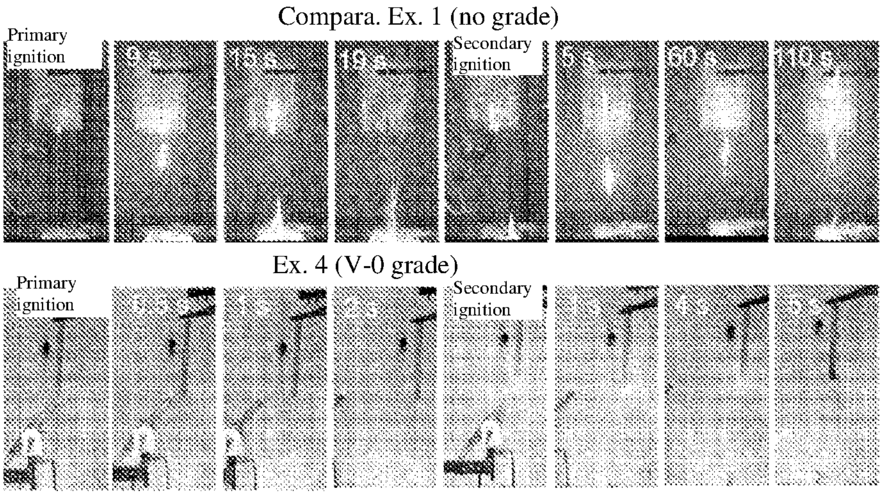
FIG. 3 shows a digital photograph of copolyester prepared in Example 4 and pure PET prepared in Comparative Example 1 in the vertical burning test.

FIG. 3 shows a digital photograph of the copolyester prepared in Example 4 of the present disclosure and pure PET prepared in Comparative Example 1 in the vertical burning test. It can be seen from the photograph that PET would not be self-extinguished after being ignited; moreover, combustion was accompanied by a large number of melt dripping, and the test grade was no grade. In contrast, the copolyester prepared by the present disclosure would be quickly self-extinguished within 10 s after being ignited; moreover, no melt dripping was produced, and the test grade was V-0. The Comparative Example 2 can only pass the V-2 grade, and the Comparative Example 3 is no grade, that is, melt dripping were still produced during the test. It is indicated that the copolyester prepared by the present disclosure can have better flame-retardant anti-dripping properties compared with the copolyester containing only high-temperature self-crosslinking functional group or only ionic group.

Figure 4:
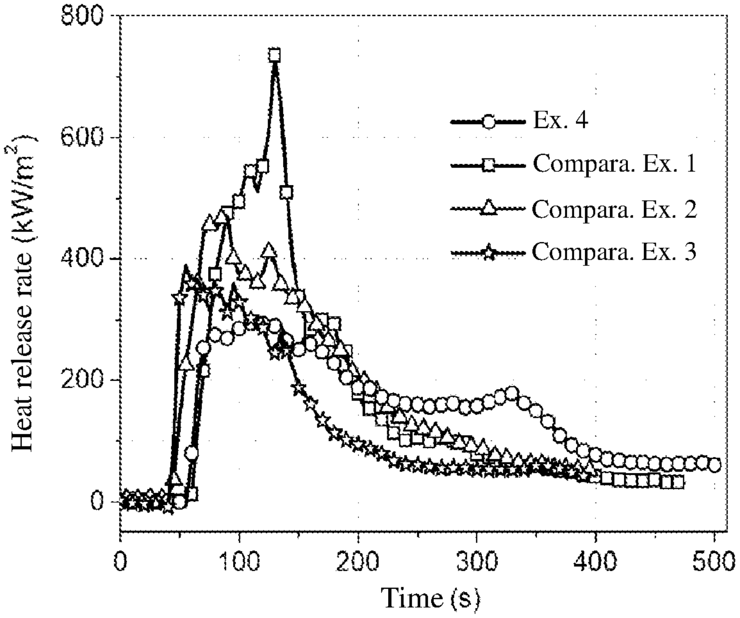
FIG. 4 shows a heat release rate curve of copolyester prepared in Example 4, pure PET (Comparative Example 1), copolyester containing only high-temperature self-crosslinking functional group (Comparative Example 2), and copolyester containing only ionic group (Comparative Example 3) in a cone calorimetry test.

FIG. 4 shows a heat release rate curve of the copolyester prepared in Example 4 of the present disclosure and the pure PET, the copolyester containing only high-temperature self-crosslinking functional group, or the copolyester containing only ionic group prepared in Comparative Examples 1-3 in a cone calorimetry test. Peak heat release rate (p-HRR) is an important parameter for judging the flame-retardant properties of materials. The lower the value of p-HRR, the better the flame-retardant properties of the materials. It can be seen from the curve comparison of the figure that the p-HRR of Example 4 of the present disclosure was 298 kW/m$^2$, which was 59.5% lower than that of pure PET, and was also much lower than 471 kW/m$^2$ of Comparative Example 2 and 392 kW/m$^2$ of Comparative Example 3, indicating that the copolyester prepared by the present disclosure exhibits better flame-retardant property.

Figure 5:
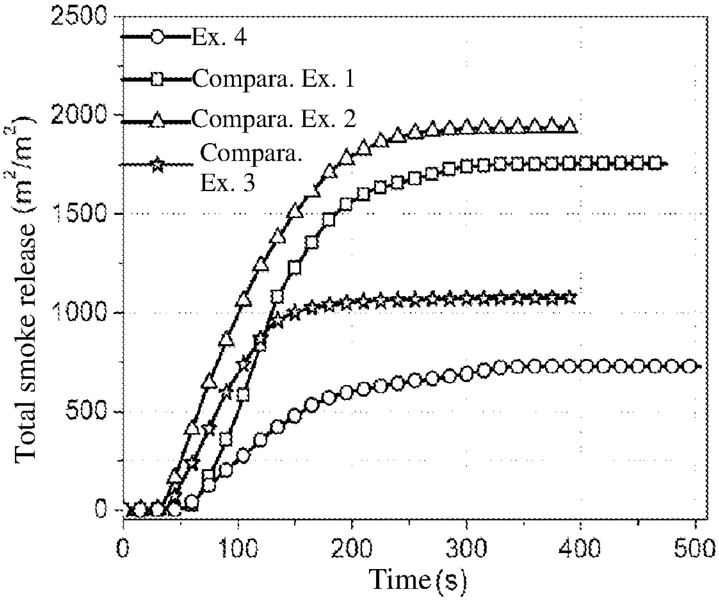
FIG. 5 shows a total smoke release (TSR) curve of copolyester prepared in Example 4, pure PET (Comparative Example 1), copolyester containing only high-temperature self-crosslinking functional group (Comparative Example 2), and copolyester containing only ionic group (Comparative Example 3) in a cone calorimetry test.

FIG. 5 shows a total smoke release (TSR) curve of the copolyester prepared in Example 4 of the present disclosure and the pure PET, the copolyester containing only high-temperature self-crosslinking functional group, or the copolyester containing only ionic group prepared in Comparative Examples 1-3 in a cone calorimetry test. It can be seen from the curve comparison in this figure that the TSR of the copolyester of the present disclosure was 728 m$^2$/m$^2$, which was not only 58.5% lower than that of pure PET, but also much lower than 1939 m$^2$/m$^2$ of Comparative Example 2 and 1077 m$^2$/m$^2$ of Comparative Example 3, indicating that the copolyester prepared by the present disclosure exhibits better smoke suppression property.

In the description of this specification, description with reference to the terms "one embodiment", "one example", etc. means that a particular feature, structure, material or characteristic described in connection with the embodiment/example is included in at least one embodiment/example of the present disclosure. In this specification, schematic description of the above terms is not necessarily directed to the same embodiment/example. Without conflict, the particular features, structures, materials or characteristics described may be combined in any one or more embodiments/examples in any suitable manner.

The above descriptions are merely specific embodiments of the present disclosure, but the protection scope of the present disclosure is not limited thereto. Any person skilled in the art can easily think of changes or substitutions within the technical scope disclosed by the present disclosure, which should be included within the protection scope of the present disclosure. Therefore, the protection scope of the present disclosure should be controlled by the protection scope of the claims.

What is claimed is:

1. A copolyester, comprising structural units represented by [I], [II], [III] and [IV]:

structural unit [I]

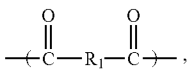

wherein $R_1$ represents an arylene group;

structural unit [II]

$$-\!\!\left(O-R_2-O\right)\!\!-,$$

wherein $R_2$ represents an alkylene group;

structural unit [III], which has a structure selected from formulae [A]-[R],

A

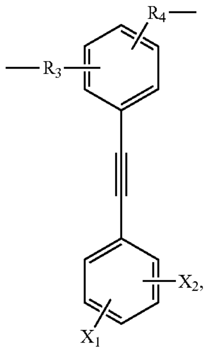

B

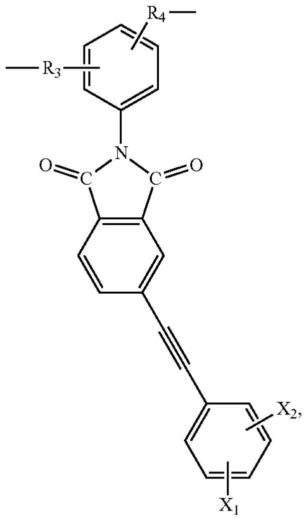

C

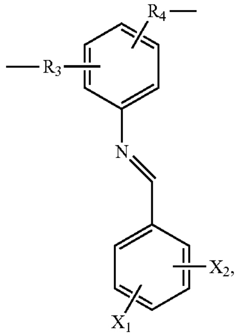

D

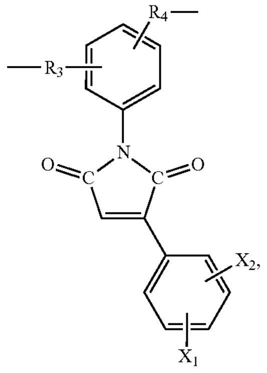

-continued
E
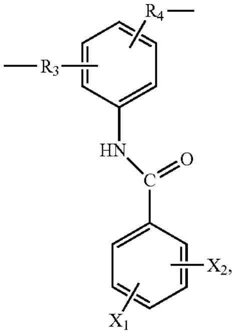
F
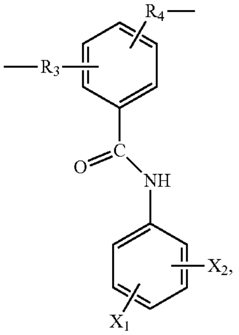
G
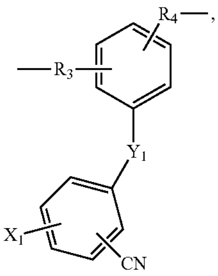
H
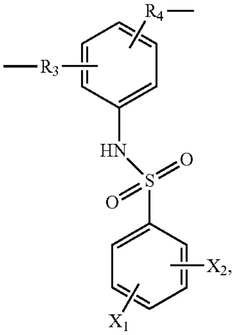
I
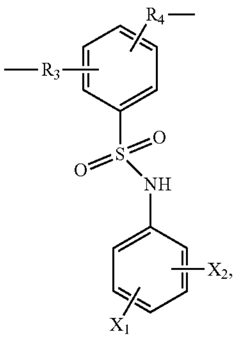
-continued
J
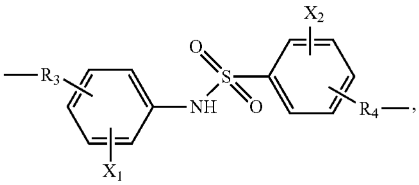
K
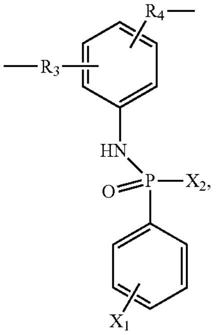
L
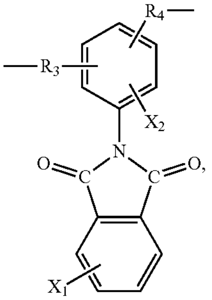
M
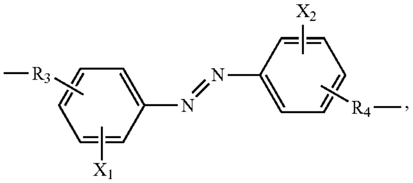
N
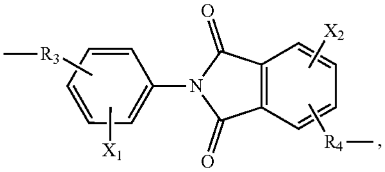
O
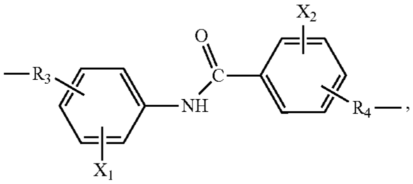
P
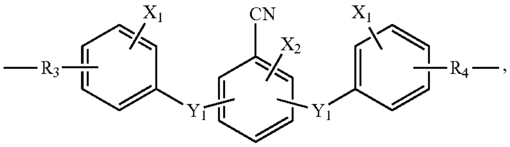

-continued

Q

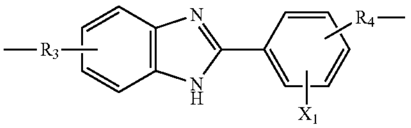

or

R

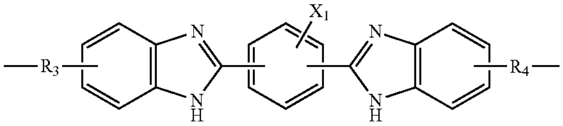

in the formulae [A]-[R], $R_3$ and $R_4$ are the same or different and are any one of carbonyl, O atom or, $O-(CH_2)_a-O$, wherein a is an integer of 2 to 12; $X_1$ and $X_2$ are the same or different and are any one of H atom, hydroxyl, methyl, ethyl, cyano, methoxy, phenylacetylenyl or phenyl; $Y_1$ is O atom or S atom;

structural unit [IV], which has a structure selected from formulae [$A_1$]-[$F_1$], $A_1$

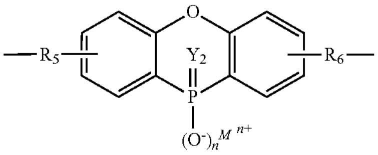

, $B_1$

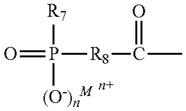

, $C_1$

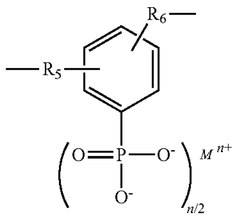

, $D_1$

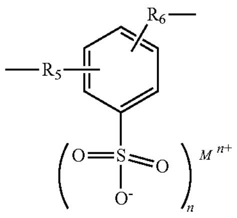

,

-continued $E_1$

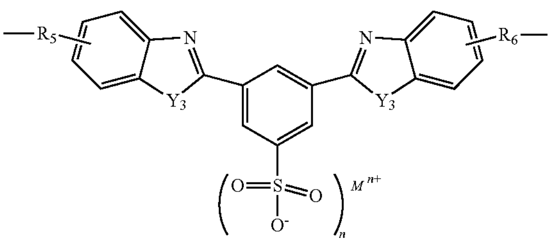

or $F_1$

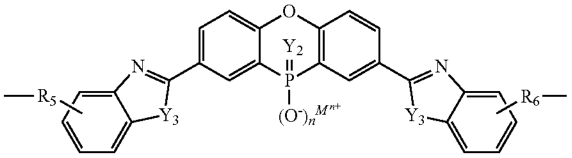

in the formulae [$A_1$]-[$F_1$], $R_5$ and $R_6$ are the same or different and are any one of carbonyl, O atom or $O-(CH_2)_a-O$, wherein a is an integer of 2 to 12; $R_7$ is $C_1$-$C_{12}$ alkyl, aryl or benzyl; $R_8$ is $C_1$-$C_8$ alkylene or arylene; $Y_2$ is O atom or S atom; $Y_3$ is any one of O atom, S atom, imino (HN<), methylimino ($CH_3N$<) or ethylimino ($C_2H_5N$<); M is any one of metal atoms Li, Na, K, Mg, Ca, Mn, Co, Ni, Ba, Fe, Cs or Zn; n is an integer of 1 to 3;

wherein the number of structural units of [III] is 1-99% of the number of structural units of [I]; when [III] is a structural unit represented by formulae A, B, C, D, E, O, G, P, L, N, M, Q or R, the number of structural units of [IV] is 0.1-99% of the number of structural units of [I]; when [III] is a structural unit represented by formulae F, H, I, J or K, the number of structural units of [IV] is 0-99% of the number of structural units of [I].

2. The copolyester according to claim 1, wherein the copolyester has intrinsic viscosity [η] of 0.20-3.50 dL/g, limiting oxygen index of 23.0-60.0%, and vertical combustion grade of V-2 to V-0.

3. The copolyester according to claim 1, wherein the number of structural units of [III] in the copolyester is 2-60% of the number of structural units of [I], and the number of structural units of [IV] in the copolyester is 0.1-60% of the number of structural units of [I]; the copolyester has intrinsic viscosity [η] of 0.30-3.20 dL/g, limiting oxygen index of 24.0-55.0% and vertical combustion grade of V-2 to V-0.

4. A preparation method of the copolyester according to claim 1, which comprises:

esterifying polyester monomers of diacid/diester and dihydric alcohol with a catalyst in proportion by direct esterification method or transesterification method, and then carrying out polycondensation reaction to obtain the copolyester product, wherein 1-99% of monomers derived from structural units shown in formulae A, B, C, D, E, O, G, P, L, N, M, Q or R, and 0.1-99% of monomers derived from structural unit [IV] based on the molar number of diacid or diester in the polyester monomers are introduced into the reaction system, or 1-99% of monomers derived from structural units shown in formulae F, H, I, J or K and 0-99% of monomers derived from structural unit [IV] based on the molar number of diacid or diester in the polyester monomers are introduced into the reaction system before the esterification reaction or between the esterification reaction and the polycondensation reaction.

5. The preparation method of the copolyester according to claim 4, wherein 2-60% of monomers derived from structural unit [III] and 0.1-60% of monomers derived from structural unit [IV] are introduced based on the molar number of diacid or diester in the polyester monomers.

6. The preparation method of the copolyester according to claim 4, wherein the monomer derived from the structural unit [III] used in the method is at least one of the following general structural formulae:

A′

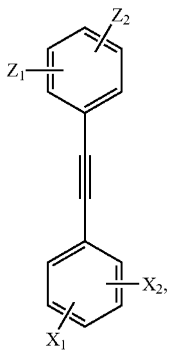

B′

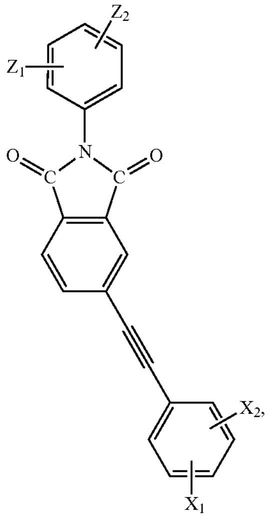

C′

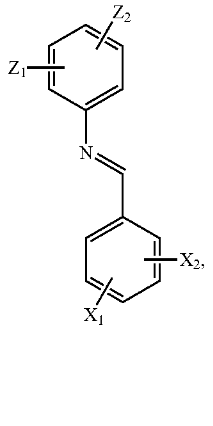

-continued

D′

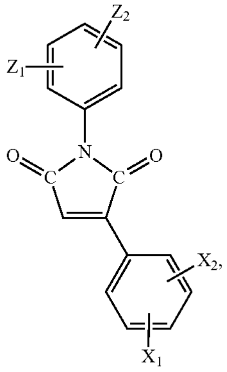

E′

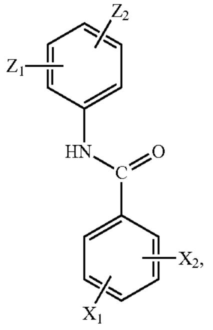

F′

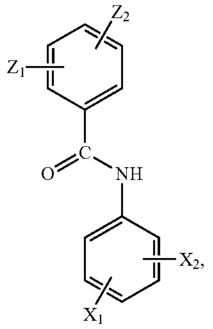

G′

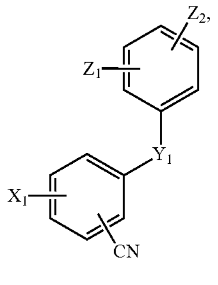

H′

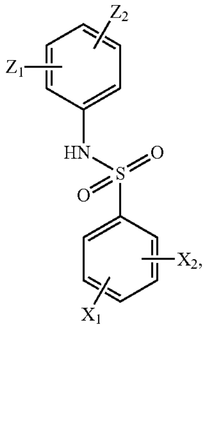

-continued

I′

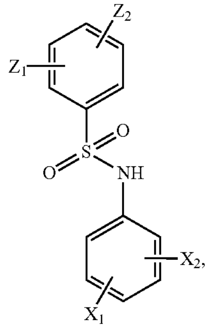

J′

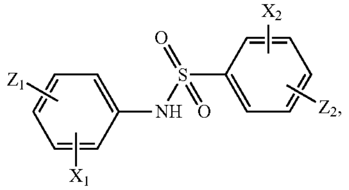

K′

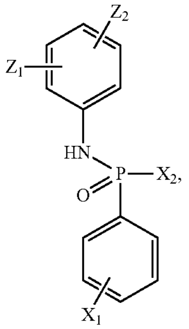

L′

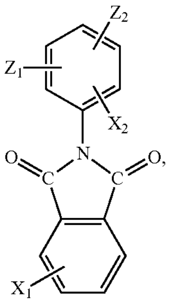

M′

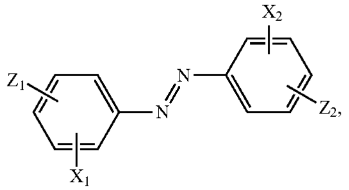

N′

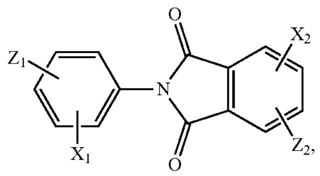

-continued

O′

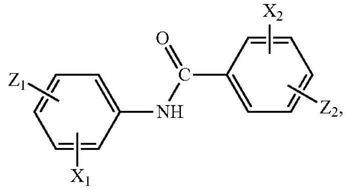

P′

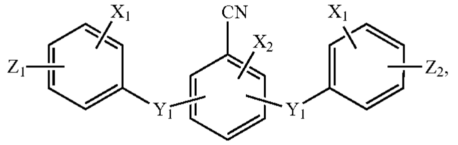

Q′

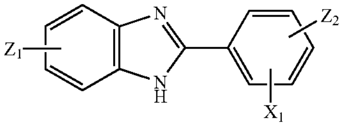

or

R′

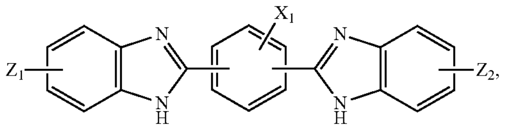

in the formulae, $Z_1$ and $Z_2$ are the same or different and are any one of carboxyl group, ester group, hydroxyl group or $$O\text{—}(CH_2)_a\text{—}OH,$$

wherein a is an integer of 2 to 12; $X_1$ and $X_2$ are the same or different and are any one of H atom, hydroxyl, methyl, ethyl, cyano, methoxy, phenylacetylenyl or phenyl; $Y_1$ is O atom or S atom.

7. The preparation method of the copolyester according to claim 4, wherein the monomer derived from the structural unit [IV] used in the method is at least one of the following general structural formulae:

$A_1'$

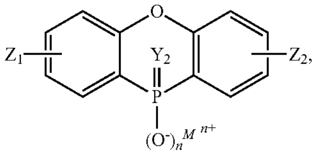

$B_1'$

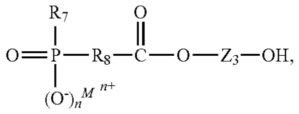

$C_1'$

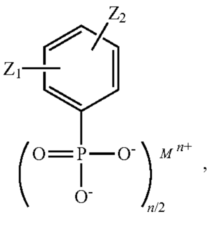

-continued

D1′

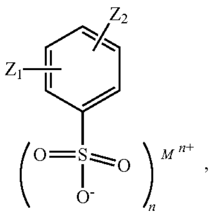

E1′

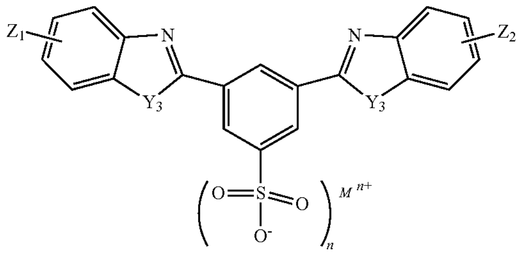

or

F1′

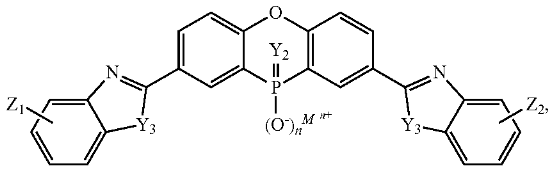

in the formulae, $Z_1$ and $Z_2$ are the same or different and are any one of carboxyl group, ester group, hydroxyl group or $$O-(CH_2)_a-OH,$$

wherein a is an integer of 2 to 12; $Z_3$ is $C_2$-$C_8$ alkylene; $R_7$ is $C_1$-$C_{12}$ alkyl, aryl or benzyl; $R_8$ is $C_1$-$C_8$ alkylene or arylene; $Y_2$ is O atom or S atom; $Y_3$ is any one of O atom, S atom, imino, methylimino or ethylimino; M is any one of metal atoms Li, Na, K, Mg, Ca, Mn, Co, Ni, Ba, Fe, Cs or Zn; n is an integer of 1 to 3.

8. The preparation method of the copolyester according to claim 6, wherein the ester group in the monomer derived from the structural unit [III] used in the method is any one of methyl ester group or ethyl ester group after esterification of monohydric alcohols, or ethylene glycol ester group, propylene glycol ester group, butanediol ester group, pentanediol ester group, glycerol ester group or pentaerythritol ester group after esterification of polyhydric alcohols.

9. The preparation method of the copolyester according to claim 7, wherein the ester group in the monomer derived from the structural unit [IV] used in the method is any one of methyl ester group or ethyl ester group after esterification of monohydric alcohols, or ethylene glycol ester group, propylene glycol ester group, butanediol ester group, pentanediol ester group, glycerol ester group or pentaerythritol ester group after esterification of polyhydric alcohols.

10. A use of the copolyester according to claim 1, which is used alone in the fields of fibers, non-woven fabrics, engineering plastics, film materials, container materials, self-healing materials, shape memory materials or 3D printing materials, or used as a functional additive for modification of polymer materials.

11. The preparation method of the copolyester according to claim 5, wherein the monomer derived from the structural unit [III] used in the method is at least one of the following general structural formulae:

A′

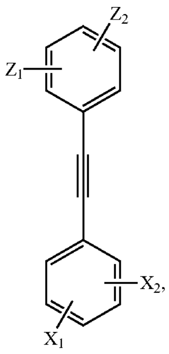

B′

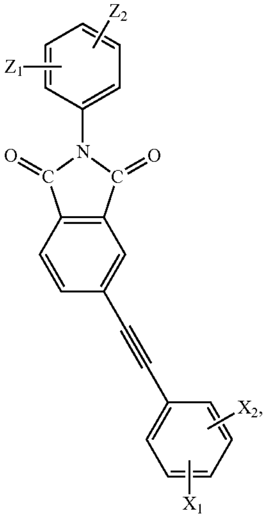

C′

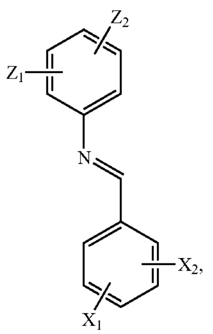

-continued
D′
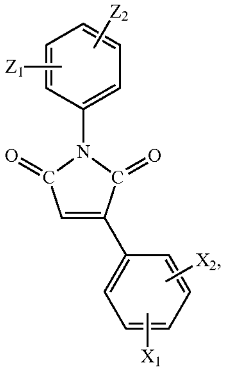
E′
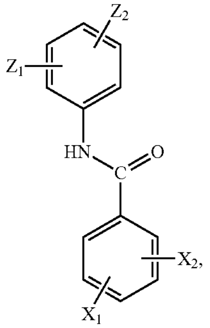
F′
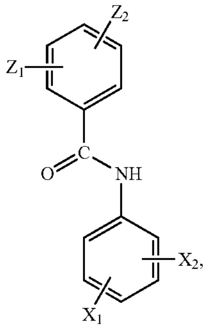
G′
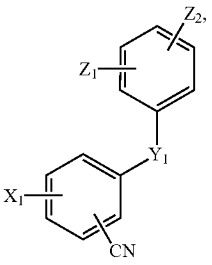
H′
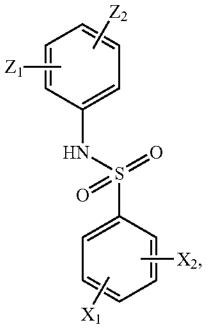
-continued
I′
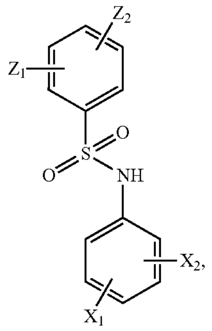
J′
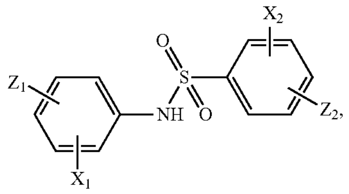
K′
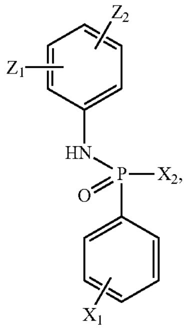
L′
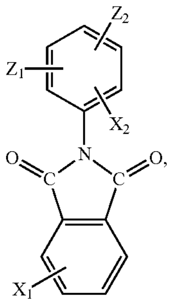
M′
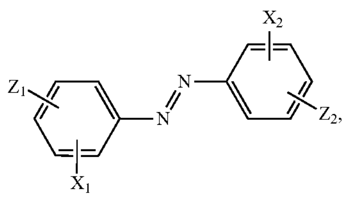
N′
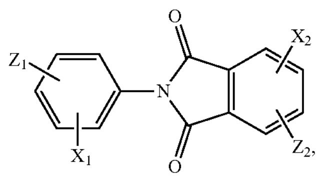

-continued

O'

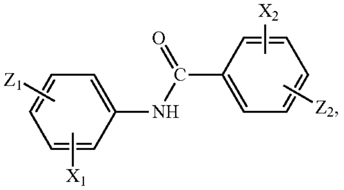

P'

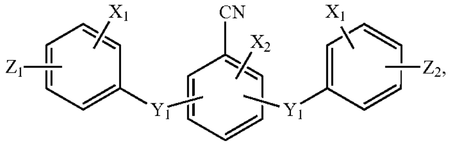

Q'

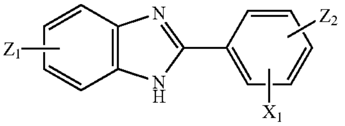

or

R'

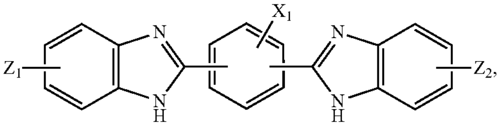

in the formulae, $Z_1$ and $Z_2$ are the same or different and are any one of carboxyl group, ester group, hydroxyl group or $O\text{-}(CH_2)_a\text{-}OH$, wherein a is an integer of 2 to 12; $X_1$ and $X_2$ are the same or different and are any one of H atom, hydroxyl, methyl, ethyl, cyano, methoxy, phenylacetylenyl or phenyl; $Y_1$ is O atom or S atom.

12. The preparation method of the copolyester according to claim 5, wherein the monomer derived from the structural unit [IV] used in the method is at least one of the following general structural formulae:

$A_1'$

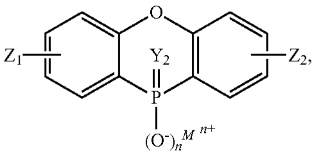

$B_1'$

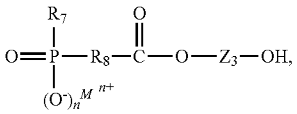

$C_1'$

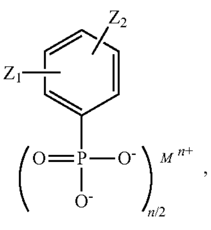

-continued $D_1'$

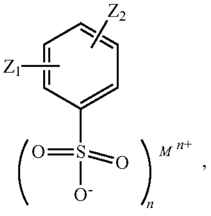

$E_1'$

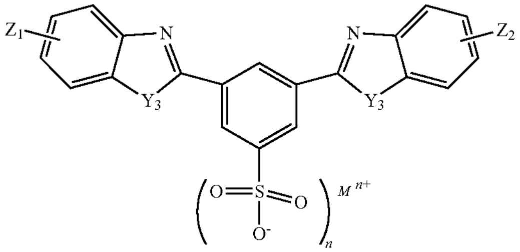

or $F_1'$

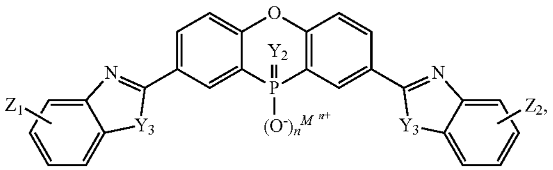

in the formulae, $Z_1$ and $Z_2$ are the same or different and are any one of carboxyl group, ester group, hydroxyl group or $O\text{-}(CH_2)_a\text{-}OH$, wherein a is an integer of 2 to 12; $Z_3$ is $C_2$-$C_8$ alkylene; $R_7$ is $C_1$-$C_{12}$ alkyl, aryl or benzyl; $R_8$ is $C_1$-$C_8$ alkylene or arylene; $Y_2$ is O atom or S atom; $Y_3$ is any one of O atom, S atom, imino, methylimino or ethylimino; M is any one of metal atoms Li, Na, K, Mg, Ca, Mn, Co, Ni, Ba, Fe, Cs or Zn; n is an integer of 1 to 3.

13. The preparation method of the copolyester according to claim 11, wherein the ester group in the monomer derived from the structural unit [III] used in the method is any one of methyl ester group or ethyl ester group after esterification of monohydric alcohols, or ethylene glycol ester group, propylene glycol ester group, butanediol ester group, pentanediol ester group, glycerol ester group or pentaerythritol ester group after esterification of polyhydric alcohols.

14. The preparation method of the copolyester according to claim 12, wherein the ester group in the monomer derived from the structural unit [IV] used in the method is any one of methyl ester group or ethyl ester group after esterification of monohydric alcohols, or ethylene glycol ester group, propylene glycol ester group, butanediol ester group, pentanediol ester group, glycerol ester group or pentaerythritol ester group after esterification of polyhydric alcohols.

* * * * *